United States Patent
Hakola

(10) Patent No.: US 7,357,824 B2
(45) Date of Patent: Apr. 15, 2008

(54) CYCLONE WITH IN-SITU REPLACEABLE LINER MECHANISMS AND METHODS FOR ACCOMPLISHING SAME

(76) Inventor: Gordon R. Hakola, 7451 E. Beryl Ave., Scottsdale, AZ (US) 85258

( * ) Notice: Subject to any disclaimer, the term of this patent is extended or adjusted under 35 U.S.C. 154(b) by 544 days.

(21) Appl. No.: 11/087,998

(22) Filed: Mar. 24, 2005

(65) Prior Publication Data

US 2005/0161374 A1    Jul. 28, 2005

Related U.S. Application Data

(63) Continuation-in-part of application No. 10/716,711, filed on Nov. 19, 2003, now Pat. No. 7,185,765.

(51) Int. Cl.
*B01D 45/12* (2006.01)
(52) U.S. Cl. .................. 55/435; 55/459.1; 209/715
(58) Field of Classification Search ................. 55/435, 55/459.1; 209/715, 717, 719
See application file for complete search history.

(56) References Cited

U.S. PATENT DOCUMENTS

| 5,597,628 A * | 1/1997 | Cetrelli et al. ............ 428/34.6 |
| 6,941,653 B2 * | 9/2005 | Dvoskin .................... 29/897.1 |

* cited by examiner

*Primary Examiner*—Robert A Hopkins
(74) *Attorney, Agent, or Firm*—Herbert E. Haynes, Jr.

(57) ABSTRACT

Apparatus and methods for replacing worn out liners in material classifying cyclones which include segmented inlet housing liners that are removable through the opened top thereof. In a first embodiment, a stacked array of the especially configured liners are supported on a lifting ring in the conical housing of the cyclone and lifting straps are used to extract the lifting ring and the liners. In a second embodiment, a special hoist is inserted into the liners and operated to clamp onto the liners and hold them in the stacked array and then the hoist and the attached liners are extracted. In either embodiment, the liners are extracted without removing the cyclone from its operating position and completely disassembling the cyclone. The extracted liners are moved to a work station for replacement as needed. Refurbished liner arrays are inserted into the cyclone by using the lifting ring or the special hoist.

16 Claims, 16 Drawing Sheets

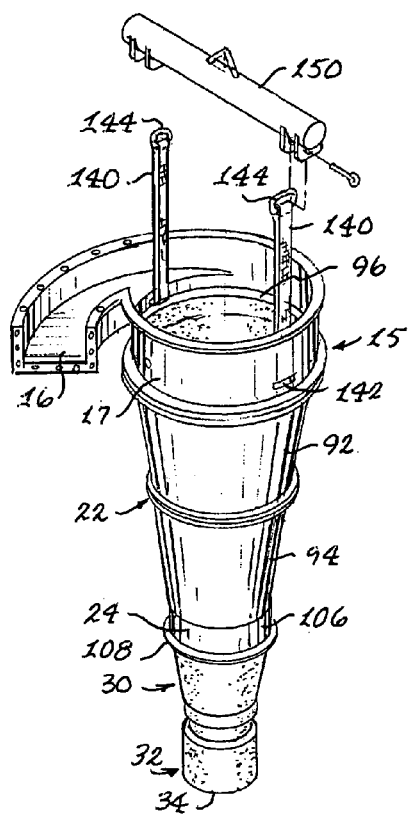
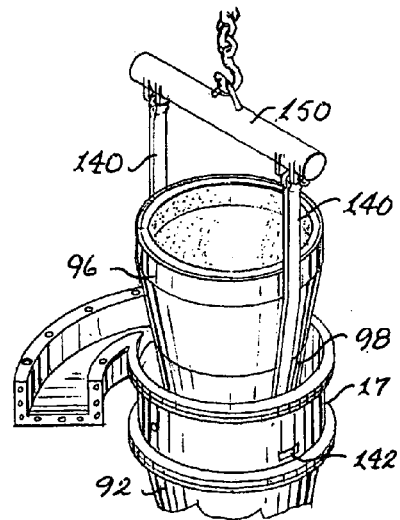
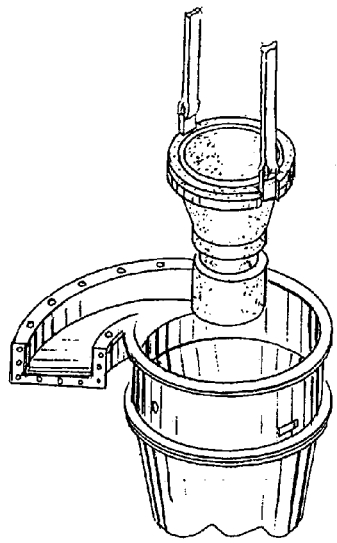
Fig-13a
Fig-13b
Fig-13c

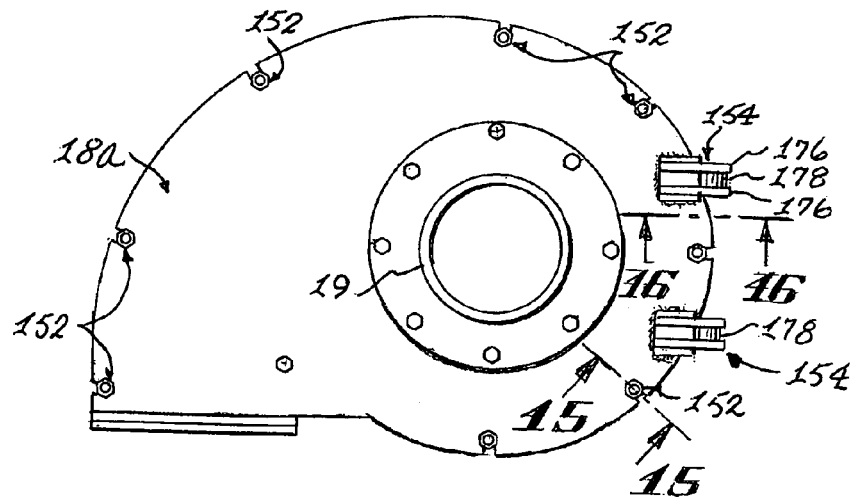
Fig-14
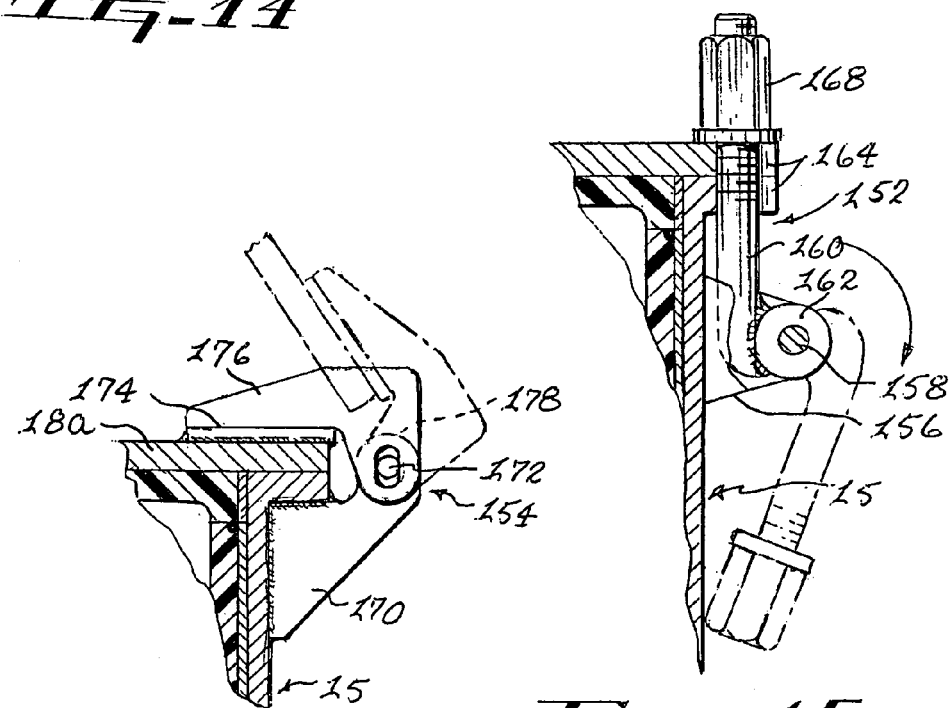
Fig-16
Fig-15

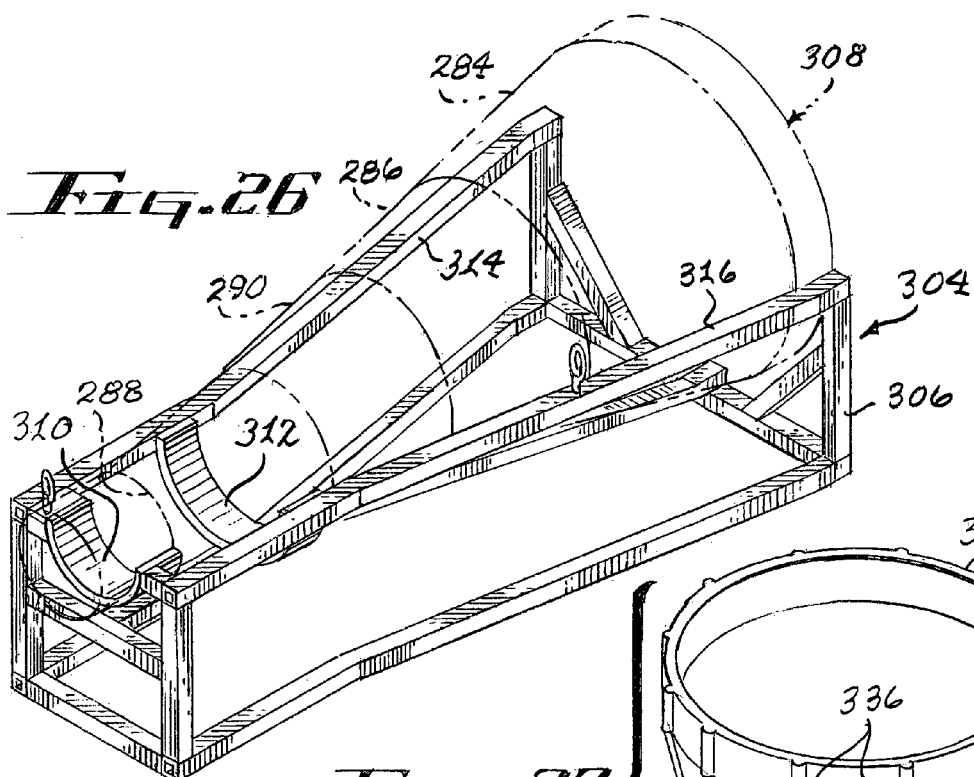
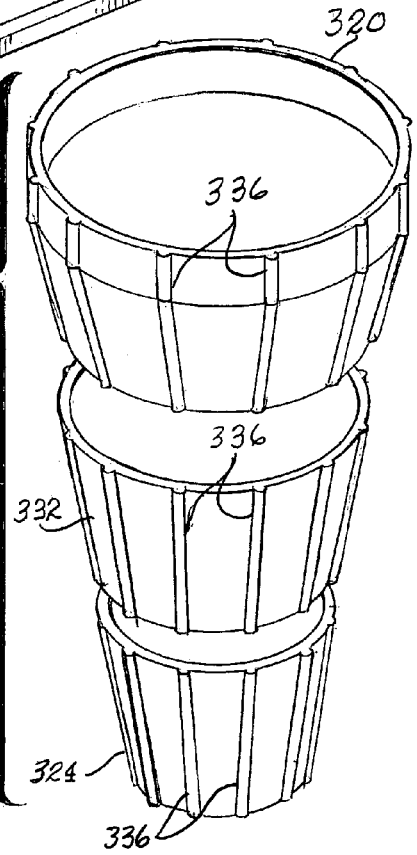
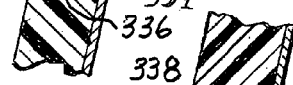
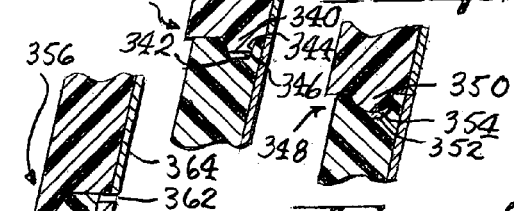

CYCLONE WITH IN-SITU REPLACEABLE LINER MECHANISMS AND METHODS FOR ACCOMPLISHING SAME

CROSS REFERENCE TO A RELATED APPLICATION

This application is a Continuation-In-Part of prior application Ser. No. 10/716,711 filed on Nov. 19, 2003, now U.S. Pat. No. 7,185,765 by the same inventor.

BACKGROUND OF THE INVENTION

1. Field of the Invention

This invention relates in general to cyclones and more particularly to especially configured cyclones with a liner system and methods by which worn liners are replaced with a minimal expenditure of time and labor and without having to remove the cyclones from their mounting base.

2. Description of the Prior Art

Cyclones are mechanisms that are used in various industries to separate different sized particles that are fed as a mixture into the inlet of the cyclone. In the mineral processing industries such as for example in the processing of copper, iron ore, lead/zinc, gold, coal and the like, a plurality of large cyclones are typically carried in mounting bases arranged in a cluster over a "tub". Each of the cyclones are in circuit with grinding mills and a slurry of water and the mineral to be classified is fed into the inlet of the cyclone. The heavier materials in the slurry exit the cyclone through an underflow outlet at the bottom of the cyclone and are returned to the grinding mill. The lighter materials are carried upwardly in a vortex created within the cyclone and exit through an overflow outlet nozzle at its upper end. The primary components of a cyclone include an inlet housing having a feed duct, and a cylindrical head section, a head section cover plate, a downwardly tapering conical housing depending from the head section, an apex cone at the lower end of the conical housing with the course material underflow outlet at the lower end of the apex cone, and an internal vortex finder coupled to the fine materials overflow outlet nozzle.

The feed duct of cyclones is often referred to as an involute which receives the slurry at high velocity from the grinding mill and directs it tangentially into the cylindrical inlet head section of the cyclone. As the slurry swirls around in the head section the weight of the slurry, and particularly the large particles, will tend to fall downwardly into the conical housing of the cyclone. The larger particles and the water carrying them will move downwardly through the apex cone and will exit the cyclone through the underflow outlet. A vortex consisting of smaller particles and the water carrying them is created within the apex cone and moves upwardly through the center of the conical housing into the vortex finder and exits the cyclone through the overflow outlet.

The feed duct, inlet head section, head section cover plate, conical housing, apex cone and the vortex finder of large cyclones of the type used in mineral processing are provided with liners which protect these components from the destructive forces imparted by highly abrasive slurries as they move through the cyclones.

As disclosed in a paper entitled "Krebs Elastomer Liner Installation Instructions", which is available on the internet at the krebs.com web site, gum rubber is the most commonly used liner material and synthetic rubber materials are also used in applications where gum rubber is not well suited. Such synthetic rubber-like materials include Neoprene, Nitrile/bunaN, Butyl, urethane and the like. Elastomeric liners are molded structures which historically are provided the annular flanges that are secured between the mating flanges of the different cyclone housing components to hold the liners in place. It is a common practice to affix these molded liners to the interior walls of the cyclone components by means of a suitable adhesive. The liners are designed to be a form fit within their respective components and compressive forces are used to install and fit the liners within each of the housing components and these forces must be maintained while the adhesive cures. In large cyclones, such as those having head section diameters of 26, 30, 33 inches, the conical housing is an assembly usually formed of two or more cone shaped housings which are bolted together at their mating flanges, and the conical housing assembly is similarly bolted to the lower end of the cylindrical head section after the large one piece liner is installed in the head section. The apex cone is bolted to the lower end of the conical housing assembly in some cyclones while others are attached by a quick release clamp as disclosed in my U.S. Pat. No. 4,541,934. In liner replacement operations involving these elastomeric liners, the cyclone housing must be disassembled, that is, the apex cone, the two or more cone shaped housings which form the conical housing assembly and the inlet housing are separated from each other and the head section cover plate is removed. This provides the access needed to peal the worn liners out of the several cyclone housing components and subsequently to apply the adhesive, install the new liners and exert the compressive forces needed to fit new liners.

As hereinbefore discussed, gum rubber is the most commonly used liner material and this is due to it providing the longest possible wear life in many applications. Alternative liner materials are used in applications where natural gum rubber is unsuitable. Synthetic rubber is used when temperature or the slurry constituents do not allow the use of natural gum rubber. Reinforced highly resilient urethane in used in applications in which rubber liners are torn rather than worn. Ceramic and silicone materials are typically used in high wear areas of the cyclone and, for example, in the coal industry such liner materials are used throughout the entire cyclone. As was the case with the replacement of rubber liners, the entire cyclone must be disassembled to accomplish replacement of the liners formed of these alternate materials. Typical installation of such liners is discussed in a paper entitled "Installation of Ceramic Parts into Krebs D-Series Cyclones" which is available on the internet at the krebs.com web site. These types of liners are molded or cast and are assembled and fit individually into the disassembled housing components which form the cyclone. The inlet head section liner is a large one piece structure which is inserted into the inlet head housing and rubber wedges are used to center the liner in the head section. The cover plate and cover plate liner is then mounted on the inlet housing which is turned upside down. The liners are inserted into the cone shaped sections and gaskets and spacer rings are then inserted sequentially between the flanges which join the inlet head section to the uppermost cone portion, and between the flanges which join the two or more conical sections to each other. The gaskets are sized so that the abutting edges of the liners are in contact with each other and a bead of silicone sealant is applied to the abutting edges to aid in sealing the joints. The liner is then inserted into the apex cone and it is then connected to the lowermost cone section of the conical housing. The cyclone is then set on its side and the feed duct and vortex finder are then attached to complete the reassembly of the cyclone.

Disassembly of large cyclones for the purpose of replacing worn liners is very labor intensive and time consuming. The first problem associated with such operations is the need for removal of the cyclone from its mounting base in the cluster of cyclones and transporting it to a dedicated repair facility or simply laying it on its side in a suitable maintenance area away from the cluster. Cyclones of this type are very awkward and can weigh up to about 5,000 pounds. Thus, the operator of the crane needed to remove and transport the cyclone must be careful not to damage the cyclone or adjacent equipment and must be skillful to precisely align the cyclone for reconnection to the material handling pipes when it is being returned to its operational position. The second problem in such operations is removal of the multiplicity of nuts and bolts which hold the various cyclone components together and typically the nuts and bolts will number between 50 and 75 depending on the size of the cyclone. There are some places on cyclones where power tools will not fit and in all cases the cyclones which are laying on their sides during this phase of the replacement operation must be moved to provide the needed access. Further, due to the hostile environment in which cyclones operate, the nuts and bolts are often rusted and must in many instances be heated or cut off to remove them.

The traditional way to determined when cyclones are in need of liner replacement is to periodically inspect the liners until accurate records of the wear characteristics are collected at which time replacement schedules can be established based upon operating time. Conducting periodic inspections of the liners is labor intensive in that access to the interior of the cyclones is needed to conduct the inspections and of course operation of the cyclone must be interrupted during the inspections.

Therefore, a need exist for a new and useful cyclone with a special liner replacement system and method which overcomes some of the problems and shortcomings of the prior art.

SUMMARY OF THE INVENTION

The present invention discloses cyclones having a special liner arrangement and means for in-situ extraction and replacement of worn out liners to eliminating the need for removal and complete disassembly of the cyclone housing during a liner replacement operation. Also disclosed are methods for accomplishing the in-situ liner extraction and replacement.

The special liners each include a rigid substrate formed of suitable material such as metal, rigid urethane or the like, with an abrasion resistant material such as rubber, high energy (soft) urethane, ceramic or other suitable liner material bonded to the substrate. The substrates are manufactured so as to conform to the shape of the particular interior wall section of the cyclone housing adjacent to which they will be placed, and the abrasion resistant material is bonded to the interior surfaces of the substrates.

The slurry inlet housing of the cyclone includes a transition duct portion which converts the slurry flow from a round in-cross-section flow provided by a supply pipe from the product grinding mill to a square in-cross-section flow within a feed duct section inlet housing. The feed duct, is sometimes referred to as an involute due to its shape and it feeds the slurry to be processed tangentially into the cylindrical head of the inlet housing. The liner used in the transition duct section of the slurry inlet is especially configured to produce the change in flow configuration and is a one piece structure having a flange which is disposed between the flanges of the supply pipe and the transition duct section. At least three separate liner segments are used in the feed duct and the cylindrical head section of the inlet housing, rather than the prior art one piece liner, to facilitate installation, fitting and subsequent removal. The liner segment used in the feed duct is configured in the involute shape of the duct and is of upwardly opening U-shape in-cross-section so that when installed it will line the bottom and side walls of the feed duct. The liner segments used in the cylindrical portion of the head section of the inlet housing are of arcuate configuration to line the interior side walls of the cylindrical head section of the inlet housing. The open top of the feed duct and the cylindrical head are closed by an inlet housing cover plate and a cover plate liner which is located in the upper end of the inlet housing below the cover plate.

The cyclone housing also includes a cylindrical vortex finder mounted in the cover plate so as to extend axially down into the head section of the inlet housing. The vortex finder is fabricated with a rigid urethane substrate to which suitable abrasion resistant exterior and interior liners are bonded. When the vortex liners are worn out, replacement is accomplished by removing attaching bolts and pulling the finder axially out of the cover plate.

The feed duct liner and the arcuate liner segments used in the inlet housing of the cyclone are held in contiguous engagement with the interior surfaces of their respective sections of the inlet housing by special fasteners. In addition to securing liners in place the special fasteners act as wear detection devices which provide an indication that liner wear is nearing the point that a replacement operation should be scheduled. The head section housing is provided with an opening at each location that a special fastener is to be used, and a bolt is positioned to extend through the opening into threaded engagement with a captive nut mounted on the interior surface of the rigid substrate of the liner. The nut is affixed to the substrate prior to bonding of the abrasion resistant material on the substrate and the bolt is sized so that its inner end is at a predetermined depth within the liner material. The bolt has an axial bore formed there through so that when the bonded liner material wears to a point where the inner end of the bolt is exposed, a small amount of the slurry will leak out through the bolt and thus provide a visual indication on the exterior of the cyclone housing that liner replacement will soon be needed.

The cyclone housing further includes a conical housing assembly which tapers downwardly from its relatively large upper end to its smaller lower end and is dependingly attached to the open lower end of the head section of the inlet housing. The liners used in the conical cyclone housing include an upper cone liner, a middle cone liner, a lower cone liner and a apex cone which will hereinafter be collectively referred to as cone liners. The upper and middle cone liners are preferably made with a high energy (soft) abrasion resistant material such as urethane bonded to the rigid substrate as described above and may be described as "drop-in" structures which fit in their proper positions within the conical housing due to the matching tapered configurations of the housing and the liners. The lower cone and the apex cone are preferably provided with ceramic liner materials which together taper from the upper end of the lower cone to a cylindrical outlet at the bottom of the apex cone. The rigid substrates of the lower cone and the apex cone are of special configuration by which the cone liners, i.e. the upper, middle, and lower cone liners and the apex cone, can be extracted from the conical cyclone housing by extraction means which will be described below. The upper end of the outer surface of the rigid substrate of the lower cone liner is of conical configuration with the lower portion thereof being cylindrical. A radially extending annular flange is formed on the apex cone and is positioned to circumscribe the open upper end thereof. The lower end of the apex cone is cylindrical and has an annular groove in its outer surface. When installed in the conical cyclone housing, the lower end of the lower cone rests on the annular flange of the apex cone and they cooperatively form a cylindrical configuration at the junction of the lower cone and the apex cone. The conical cyclone housing is especially configured to provide a cylindrical lower end the open lower end of which is circumscribed by an inwardly extending ring-shaped shelf. The cylindrical configuration formed at the junction of the lower cone and the apex cone is located in the cylindrical lower end of the conical cyclone housing when the lower cone and the apex cone are mounted therein.

A cylindrical anti-splash skirt of tubular shape is mounted so as to depend from the lower end of the apex cone. The cylindrical body of the skirt is formed of high energy (soft) urethane and an inwardly extending flange circumscribes the open upper end of the skirt. The inherently resilient nature of the skirt material allows it to be installed and subsequently removed by snapping it onto the cylindrical lower end of the apex cone with the flange of the skirt being disposed in the annular groove of the apex cone. An optional snap-in rubber liner can be installed inside the anti-splash skirt.

In a first embodiment of the extraction means, a circular lifting ring is supported on top of the ring-shaped shelf provided at the lower end of the cyclone housing with the flange of the apex cone resting on the lifting ring. The body of the apex cone and the splash skirt extend axially downwardly through the lifting ring and depend from the open lower end of the conical housing. The lower, middle and upper cones are arranged in an axially stacked array on the upper surface of the flange of the apex cone and will move as an entity when the lifting ring is moved upwardly toward the inlet section of the cyclone housing.

A pair of hoisting straps or cables are attached to diametrically opposed sides of the lifting ring and extend upwardly therefrom between the exterior of the cone liners and the inner surface of the conical cyclone housing. The upper ends of the hoisting straps or cables each pass through a different one of a pair of diametrically opposed slots formed proximate the lower end of the head section of the inlet housing so that the upper ends of the straps are stored outside the cyclone housing until needed to accomplish a liner replacement operation.

In a second embodiment, the extraction means includes a hoist assembly which is lowered axially into the cone liners that are located in conical housing and the hoist is operated to exert a clamping action on the cone liners and attach itself to them and hold them in their axially stacked positions. The hoist assembly and the cone liners are then lifted out of the conical housing through the open top end of the inlet housing by a suitable lifting device such as a crane. The hoist assembly and the extracted cone liners can then be placed on a staging fixture and the hoist assembly is removed to allow inspection of the liners for wear and replacement as needed. When the inspection and replacement operations are complete, the hoist assembly can then be axially inserted into cone liners and clamped in place to allow the hoist assembly to be used to install the cone liners in the conical housing of the cyclone.

The upper, middle and lower cones which form the stacked array of liners are preferably provided with a plurality of spaced apart longitudinally extending ribs on their exterior surfaces so that the cone liners will be self-centering when installed in the conical housing of the cyclone, and can be easily reworked to fit within dented, out-of-round or otherwise irregular housings. Further, the mating surfaces between the inlet housing liners, the upper and middle cone liners and between the middle and lower cone liners are preferably formed with special jointed surfaces, such as a tongue and groove arrangement, so that the liners will be self-aligning and will be sealed against leakage at those mating surfaces.

Both embodiments of the methods of the present invention for in-situ replacement of cyclone liners includes the first step of disconnecting the slurry supply and overflow pipes from the cyclone to be serviced followed by the step of removing the cover plate and cover plate liner. Prior to removing the cover plate and cover plate liner, the optional step of removing the overflow nozzle and the vortex finder may be accomplished or they can be left in place and removed along with the cover plate. Then the feed duct liner and the arcuate liner segments are lifted out of the inlet housing.

When the extraction means of the first embodiment is used, the next step of the method of the present invention involves fishing the upper ends of the hoisting straps or cables through the slots formed in the head section of the cyclone housing to move them into the interior of the cyclone head section. Then the upper ends of the hoisting straps are connected to a suitable bail that is coupled to a crane which pulls the hoisting straps, and the lifting ring and the cone liners upwardly in the cyclone housing. The next step is interrupting the upward movement of the lifting ring when the upper cone liner clears the open upper end of the cyclone housing and removing the upper cone liner manually from the stacked array of liners. The next step is restarting the upward movement of the lifting ring until the middle cone liner clears the open upper end of the cyclone and halting the upward movement so that the middle cone liner can be manually removed from the stack. The next steps includes repeating the step of restarting and subsequently halting the upward movement of the lifting ring until the lower cone and the apex cone have been removed from the cyclone housing. The cyclone liner replacement operation is completed by the steps of inspecting the liners and replacing those showing excessive wear with new liners and installing them in the cyclone housing by performing the above recited steps in the reverse order.

When the extraction means of the second embodiment is used the step which follows the removal of the segmented inlet head liners and the feed duct liners, includes the step of inserting a hoist assembly axially into the cone liners housed within the conical housing of the cyclone, followed by operating the hoist assembly to exert a clamping action on cone liners to attach itself to them and hold them in their axially stacked positions. The next step is extracting the hoist assembly and the attached cone liners from the cyclone by axially moving them upwardly from the conical housing and through the opened inlet housing. The following preferred steps may be included in this second embodiment of the method of the present invention and they include placing the hoist assembly and the attached cone liners on a staging device followed by removing the hoist assembly from the cone liners. The next step is inspecting the cone liners for wear followed by replacing those that are worn out. When the liner replacing step is completed, the next step is inserting the hoist assembly axially into the cone liners and operating it to exert a clamping action thereon to attach the hoist assembly to the cone liners and hold them in their axially stacked positions. Then inserting the hoist assembly and the attached cone liners into the conical housing of the cyclone is the next step followed by removing the hoist assembly from the inserted cone liners. The final steps include installing the segmented inlet liners and the feed duct liner in the inlet housing and reinstalling the overflow nozzle and vortex finder and the cover plate and cover plate liner. Reconnecting the slurry supply and overflow pipes completes the steps of the second embodiment of the method of the present invention.

BRIEF DESCRIPTION OF THE DRAWINGS

FIGS. 13a through 13c are perspective views of the cyclone housing illustrating some of the steps of the first embodiment of the method of the present invention.

FIG. 14 is a top view similar to FIG. 2 but showing a modification of the cover plate attachment arrangement.

FIG. 15 is an enlarged fragmentary sectional view taken along the line 15-15 of FIG. 14.

FIG. 16 is an enlarged fragmentary sectional view taken along the line 16-16 of FIG. 14.

FIG. 22a is an enlarged fragmentary sectional view taken along the line 22a-22a of FIG. 22.

FIG. 26 is a perspective view of a staging device upon which the extracted cone liners are placed for inspection of wear and replacement as needed.

FIG. 27 is an exploded view of a special configuration of the liners that form the stacked array of cone liners.

FIGS. 28a through 28d show various configurations of joints formed that may be formed at the mating surfaces of the liners shown in FIG. 27.

DESCRIPTION OF THE PREFERRED EMBODIMENTS

Figure 1:
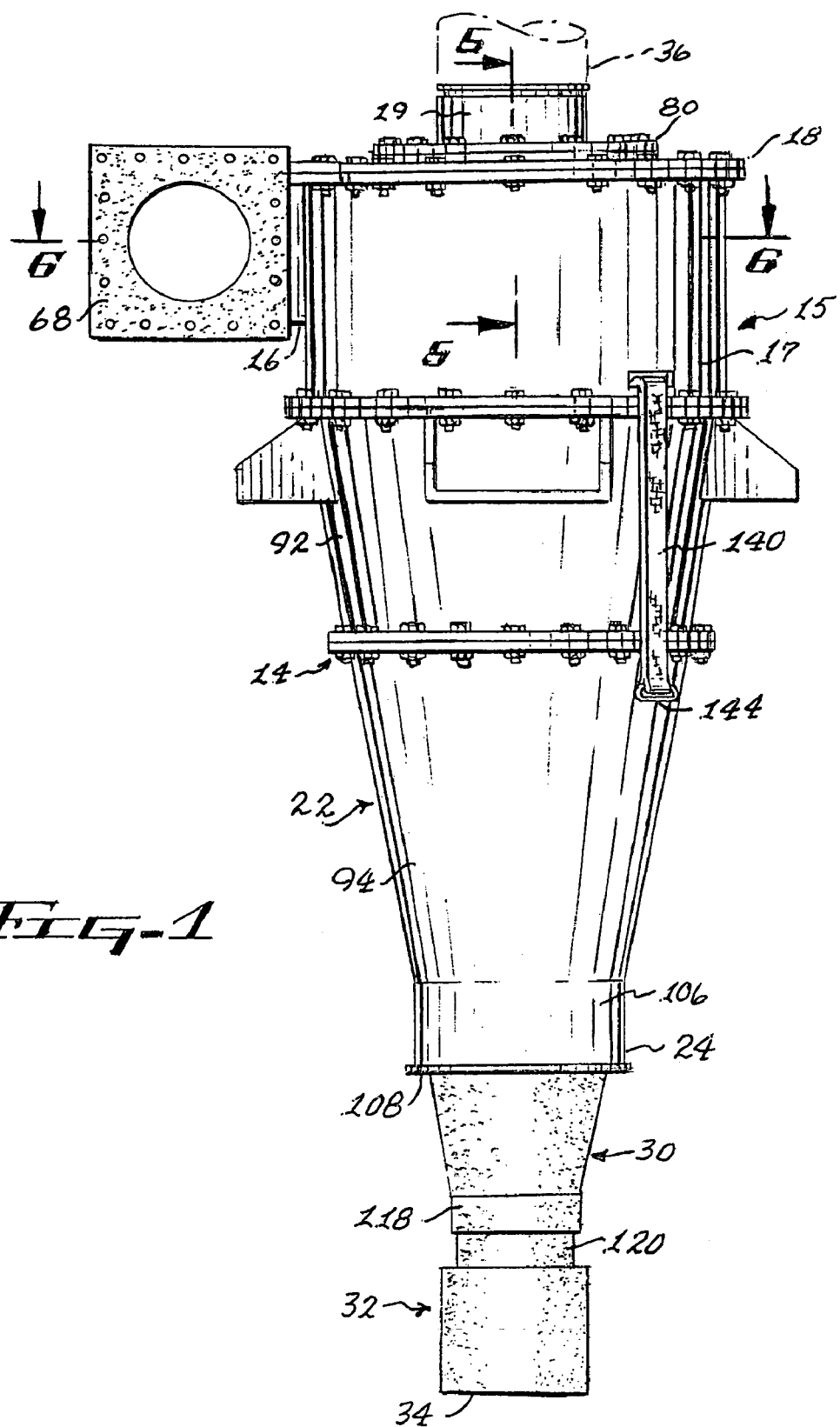
FIG. 1 is an elevational view of a cyclone incorporating the features of the first embodiment of the present invention.

Referring more particularly to the drawings, FIG. 1 shows a typical cyclone which is indicated in its entirety by the reference numeral 14. To insure a clear understanding of the present invention, the basic components and features the cyclone 14 will now be described. Briefly, the cyclone 14 includes an inlet housing 15 having a feed duct section 16 and a cylindrical head section 17. The top of the inlet housing 15 is closed by a removable cover plate 18 having an overflow nozzle 19 mounted thereon which is in communication with a vortex finder 20 that depends from the cover plate 18 axially into the cylindrical head section 17 of the inlet housing 15. A conical housing 22, which is usually an assembly including two or more truncated conical housings, depends axially from the cylindrical head section 17 and is disposed so that its small apex end 24 is at the lower end of the conical housing. The conical housing 22 shown in the accompanying drawings is not typical in that it is especially configured for reasons which will become apparent as this description progresses.

Figure 2:
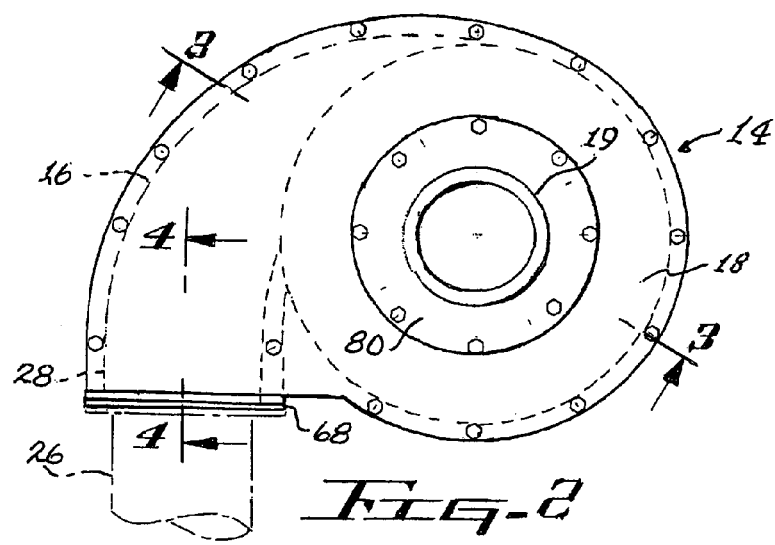
FIG. 2 is a top view of the cyclone shown in FIG. 1.
Figure 3:
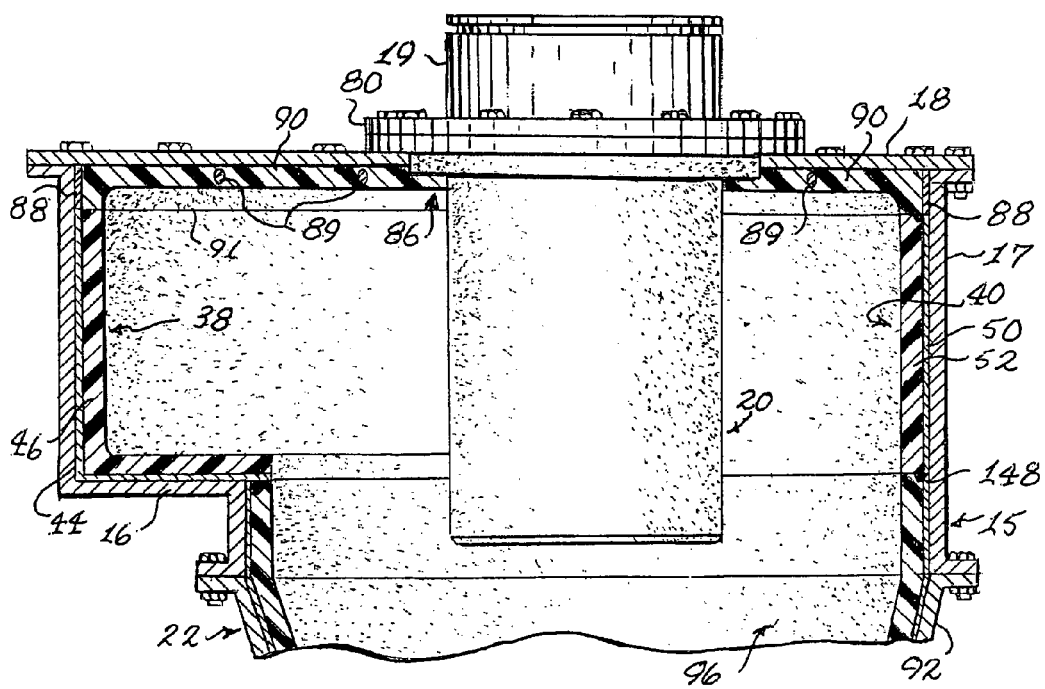
FIG. 3 is an enlarged fragmentary sectional view taken along the line 3-3 of FIG. 2.
Figure 4:
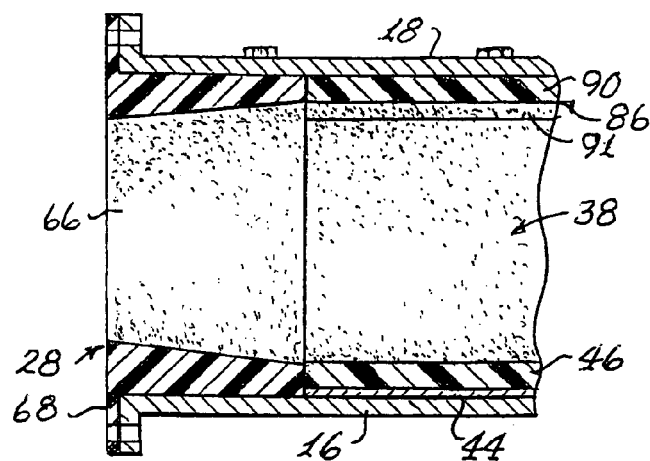
FIG. 4 is an enlarged fragmentary sectional view taken along the line 4-4 of FIG. 2.
Figure 6:
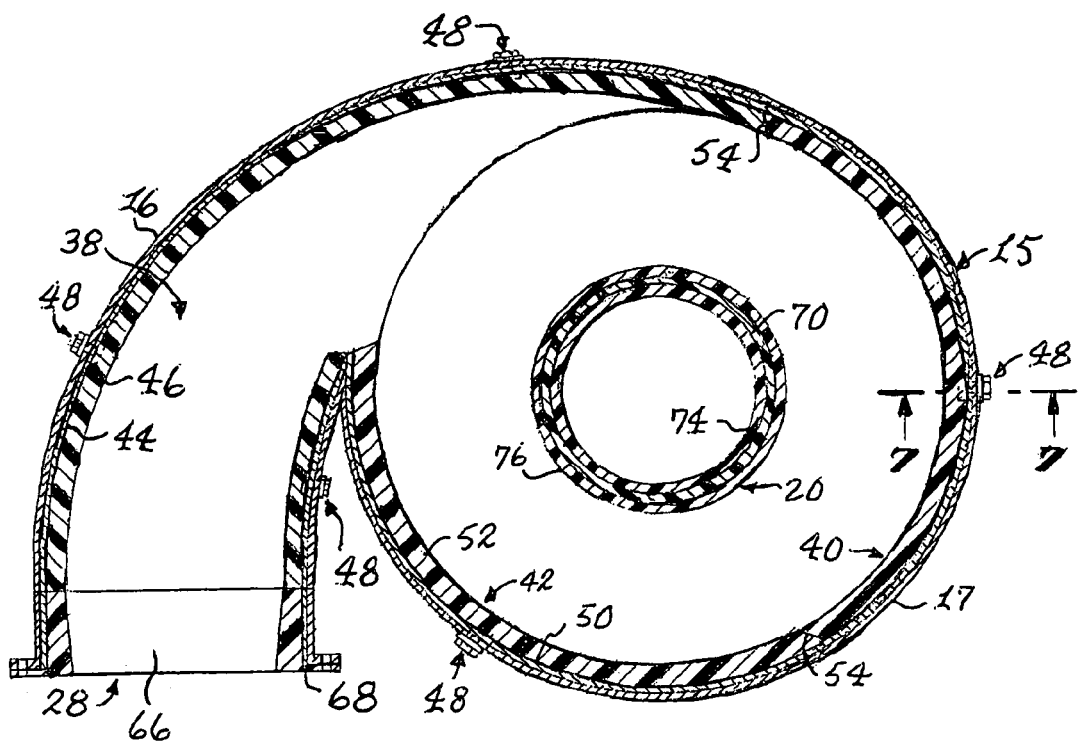
FIG. 6 is an enlarged fragmentary sectional view taken along the line 6-6 of FIG. 1.
Figure 7:
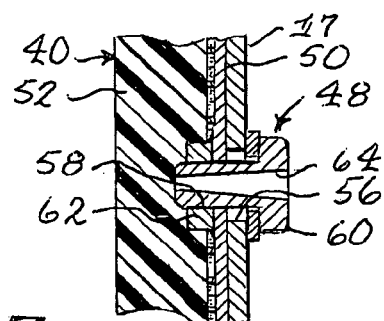
FIG. 7 is an enlarged fragmentary sectional view taken along the line 7-7 of FIG. 6.

The material to be processed in the cyclone 14 is in the form of a slurry which is a mixture usually of water and a range of different sized particles which are to be classified in the cyclone. The particles can be various minerals such as iron ore, coal and the like which are delivered from a grinding mill (not shown) to the cyclone by a suitable supply conduit 26 which is shown in dashed lines in FIG. 2. The slurry received from the conduit 26 passes through a transition duct section 28 located at the inlet end of the feed duct 16. The feed duct 16 is sometimes referred to as an "involute" in that, as best seen in FIG. 6, it directs the slurry in a curved flow path to an outlet which is tangential to the cylindrical head section 17 of the inlet housing 15. The slurry enters the cyclone 14 at high velocity and swirls around the vortex finder 20 in the cylindrical head section 17 of the inlet housing 15. Due to the weight of the swirling slurry, peripheral portions of it, and particularly the larger particles, will tend to fall downward from the head section 17 into the conical housing 22 of the cyclone 14. The larger particles and the water carrying them will move downwardly through an apex cone 30 and a splash skirt 32 located at the apex end 24 of the conical housing 22 and will exit the cyclone 14 through an underflow outlet 34 provided at the open lower end of the splash skirt. A vortex is created within the apex cone 30 which carries a slurry of classified particles and water upwardly through the center of the conical housing 22 and the head section 17 of the inlet housing 15 and through the vortex finder 20 and outlet nozzle 19 into a discharge duct 36 that is shown in dashed lines in FIG. 1.

In the mineral processing industry, large cyclones such as those having inlet head diameters of 28, 30 an 33 inches are normally used and due to the highly abrasive nature of the slurries, such cyclones are provided with abrasion resistant liners to prevent destruction of the cyclone housings. As will now be described in detail, the special liner system of the present invention significantly reduces, and in some instances eliminates, the previously described problems associated with replacing worn out prior art liners.

Reference is now made to FIGS. 3 through 8 wherein the multiple liners 38, 40 and 42 are shown as being used in the inlet housing 15 instead of the prior art one piece liner. The liner 38 used in the feed duct 16 includes a rigid substrate 44 to which an abrasion resistant material 46 is bonded. The rigid substrate 44 is formed of any suitable material such as metal, fiberglass, rigid urethane or the like, and the abrasion resistant material 46 is preferably a high energy (soft) material such as gum rubber, synthetic rubber or soft urethane. The liner 38 is configured to conform to the involute shape of the feed duct 16 and is of upwardly opening U-shape in-cross-section so as to line the bottom and side walls of the feed duct 16. The involute liner 38 is demountably fixed in the feed duct 16 by attachment means in the form of special fasteners 48 which will hereinafter be described in detail. The liners used in the cylindrical head 17 of the inlet housing 15 are shown as being the two liners 40 and 42, however, more than two can be used. Both of the liners 40 and 42 are formed with a rigid substrate 50 to which an abrasion resistant material 52 is bonded, with the substrate and abrasion resistant material preferably being the same as the materials used in the involute liner 38. The liners 40 and 42 are of arcuate configuration so as to conform to the interior surface of the cylindrical head section 17 of the inlet housing 15, and the previously mentioned special fasteners 48 are used to demountably secure the arcuate liners 40 and 42 in place. The involute and arcuate liners 38, 40 an 42 are formed with beveled end edges 54 at each location where the liners form a junction with each other to seal the joints at those locations.

In addition to mounting the involute and arcuate liners 38, 40 and 42 within their respective parts of the inlet housing 15, the special fasteners 48 briefly mentioned above act as wear detection devices that provide an indication that liner wear is nearing the point that a replacement operation should be scheduled. A typical one of the fasteners 48 is seen best in FIG. 7 as securing the arcuate liner 40 in contiguous engagement with the interior wall of the head section 17, and it will be understood that the following description will apply to each of the special fasteners. Aligned openings 56 and 58 are provided in the head section housing 17 and in the rigid substrate 50 respectively, and a bolt 60 extends through those openings into threaded engagement with a captive nut 62 that is welded or otherwise affixed to the interior surface of the rigid substrate 50 of the liner. The nut 62 is affixed to the substrate 50 prior to bonding of the abrasion resistant material 52 thereto and when the bonding is accomplished, the nut is buried in the material 52. The bolt 60 has an axial bore 64 formed there through and the bolt is sized so that when in threaded engagement with the nut 62, the inner end of the bolt 60 is at a predetermined depth below the inner surface of the abrasion resistant material 52. When the abrasive resistant material 52 wears to a point where the inner end of the bolt 60 is exposed, a small amount of the slurry will leak out through axial bore 64 of the bolt and thus provide a visual indication on the exterior of the inlet housing 15 that liner replacement will soon be needed. The axial bore 64 formed in the bolt 60 is preferably tapered with its small end located at the inner end of the bolt to prevent clogging of the axial bore by particles carried in the slurry. The buried depth of the inner end of the bolt 60 is such that when slurry leakage is seen, a sufficient thickness of the abrasion resistant 52 remains so that immediate liner replacement is not needed and can be scheduled at a convenient time.

A special liner 66 is provided for use in the transition duct section 28 of the feed duct 16. The transition duct liner 66 is a one piece structure molded or otherwise formed of a suitable abrasion resistant material which is preferably the same as the material used in the liners 38, 40 and 42. The transition duct liner 66 is configured to change the flow of the incoming slurry from the round-in-cross-section configuration provided by the supply conduit 26 into the square-in-cross-section configuration of the feed duct 16. The transition duct liner 66 is formed with a flange 68 at its inlet end and the liner is held in place by its flange 68 being interposed between the flanges of the feed duct 16 and the supply conduit 26.

Figure 5:
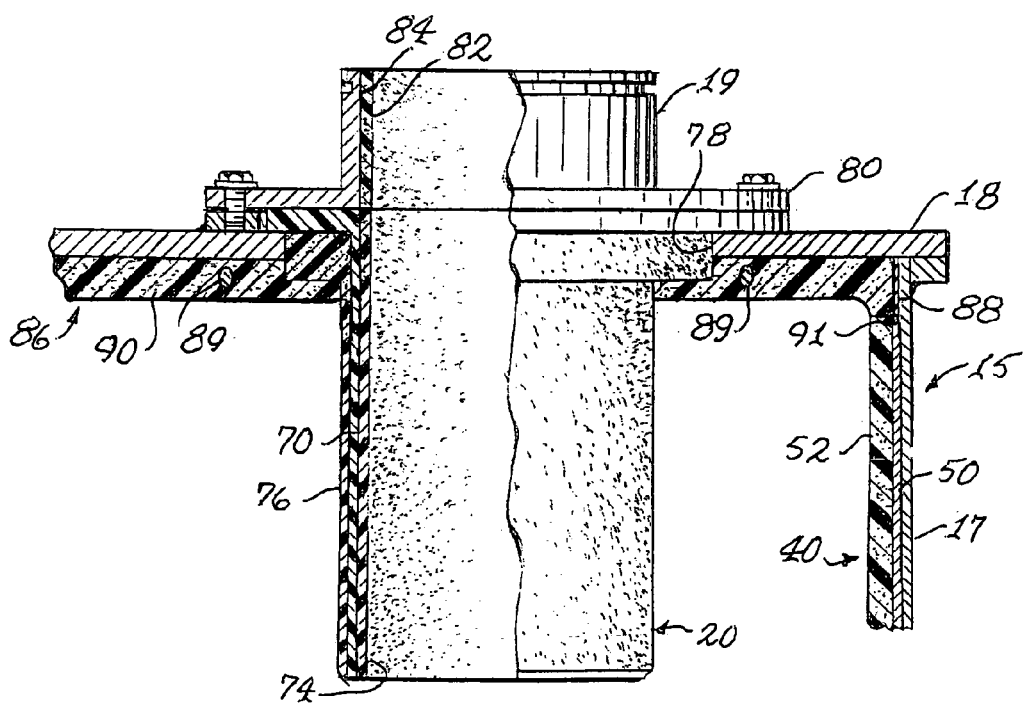
FIG. 5 is an enlarged fragmentary sectional view taken along the line 5-5 of FIG. 1.

As seen best in FIG. 5, the vortex finder 20 is preferably formed with a rigid tubular substrate 70 having a flange 72 at its upper end. An inner ceramic liner 74 is bonded to the inner surface of the tubular substrate 70 and an outer ceramic liner 76 is bonded to the exterior surface of the tubular substrate to provide the vortex finder with an extended life. The vortex finder 20 is demountably secured within an opening 78 formed in the cover plate 18 by having the flange 72 of its rigid substrate 70 located between the outer surface of the cover plate 18 and the flange 80 of the overflow nozzle 19 which is bolted to the cover plate. A liner 82 of suitable abrasion resistant material can be bonded within the bore 84 of the overflow nozzle 19.

Figure 8:
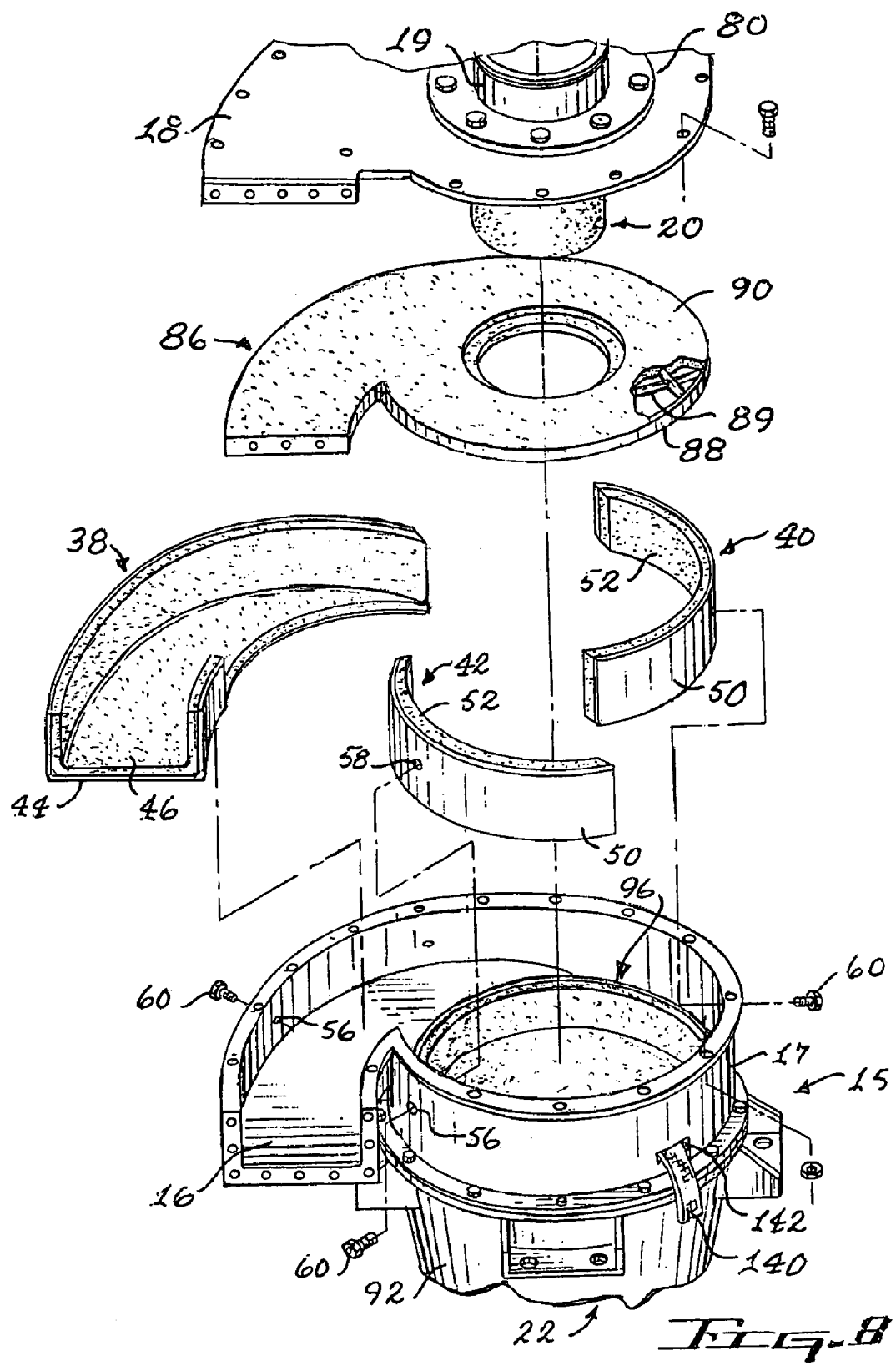
FIG. 8 is a perspective view showing the cover plate, cover plate liner, the feed duct liner and the inlet head liners exploded from the open top of the cyclone.

The involute liner and the arcuate liners 38, 40 and 42 respectively, do not extend all the way up to the opening at the top end of the inlet housing 15. A cover plate liner 86 as seen best in FIG. 8, is preferably formed with peripheral metal band 88 and an internal frame 89 for supporting a suitable molded abrasion resistant material 90 having a depending peripheral lip 91. When the cover plate 18 and the cover plate liner 86 are in their assembled positions, the depending lip 91 of the cover plate liner 86 exerts a downward force on the top edges of the liners 38, 40 and 42 to seal the joint there between. The cover plate liner 86 may be simply placed in the open top of the inlet housing 15 or can be attached to the underside of the cover plate 18 by suitable fasteners(not shown).

As previously mentioned, the conical housing 22, which is usually an assembly including two or more housings of truncated conical configuration, depends axially from the cylindrical head section 17 of the inlet housing 15 and is disposed so that its small apex end 24 is at the lower end of the conical housing. In the embodiment shown best in FIGS. 1 and 9, the conical housing 22 has an upper cone housing 92 and a lower cone housing 94 with the latter being of special configuration which will hereinafter be described in detail. The liners used in the conical housing 22 are of truncated conical configuration and include an upper cone liner 96 which is used to line the inner wall of the upper cone housing 92 and a middle cone liner 98 which is used to line the inner wall at the upper end of the lower cone housing 94. The upper and middle cone liners 96 and 98 are preferably made with a high energy (soft) abrasion resistant liner material 100 such as high energy urethane which is bonded to a rigid metallic substrate 102. The upper and middle cone liners 96 and 98 may be described as "drop-in" structures which fit in their proper positions within the conical housing 22 due to the matching tapered configurations of the cyclone housing and the liners. The inner wall at the lower end of the lower cone housing 94 is lined with a lower cone liner 104. The apex cone 30 and the splash skirt 32 depend axially from open apex end 24 of the conical housing 22. The lower end of the lower cone housing 94, the lower cone liner 104 and the apex cone 30 are especially configured to facilitate replacement of the liners 96, 98, and 104 along with the apex cone 30 and the splash skirt 32 when those components become worn out.

The lower cone housing 94 is especially configured to include the first embodiment of the means for extracting and replacing the cone liners contained in the conical housing when they become worn. The lower cone housing 94 is of downwardly tapering conical configuration for most of its axial length and deviates from conventional conical cyclone housings by being formed with a cylindrical lower portion 106. An annular ring-shaped shelf 108 extends inwardly into the opening at lower end of the cylindrical portion 106 of the lower cone housing 94 and a lifting ring 110 is supported on the upper surface of the shelf 108. The function and structural details of the lifting ring 110 will hereinafter be described in detail. The apex cone 30 has a rigid substrate 112 formed of a suitable material such as rigid urethane with a bonded liner 114 which is preferably formed of ceramic to better withstand the severe abrasive forces that occur within the apex cone 30. An annular flange 116 is formed on the substrate 112 and is disposed to circumscribe the open upper end of the apex cone 30. The apex cone is of tapered configuration for most of its axial length and has a cylindrical lower end 118 in the outer surface of which an annular groove 120 is provided. The annular flange 116 of the apex cone 30 is supported on the lifting ring 110 so that the apex cone depends axially through the opening at the apex end 24 of the cylindrical portion 106 of the lower cone housing 94. The lower cone liner 104 has a rigid substrate 122 formed of a suitable material such as rigid urethane with a bonded liner 124 which is preferably formed of ceramic to better withstand the severe abrasive forces that occur in that area of the cyclone. The bonded liner 124 of the lower cone liner 104 is cone shaped as is the inner surface of the substrate 122, however, the lower portion of the outer surface of the substrate is cylindrical to provide a thickened wall 126 at the bottom end of the lower cone liner 104. The thickened wall 126 of the lower cone liner 104 is supported on the upper surface of the annular flange 116 of the apex cone 30.

The anti-splash skirt 32 has cylindrical tubular body 128 and is mounted so as to depend from the lower end of the apex cone 30. The tubular body 128 of the skirt 32 is formed of high energy (soft) urethane and has an inwardly extending flange 130 that circumscribes the open upper end of the skirt body. The inherently resilient nature of the skirt material allows it to be demountably attached to the cylindrical lower end 118 of the apex cone 30 by snapping the flange 130 of the skirt body 128 into the annular groove 120 of the apex cone. An optional snap-in elastomeric liner 132 can be installed inside the anti-splash skirt 32, and will be supported by an inwardly extending circular flange 134 formed at the bottom end of the skirt body 128.

Figure 11:
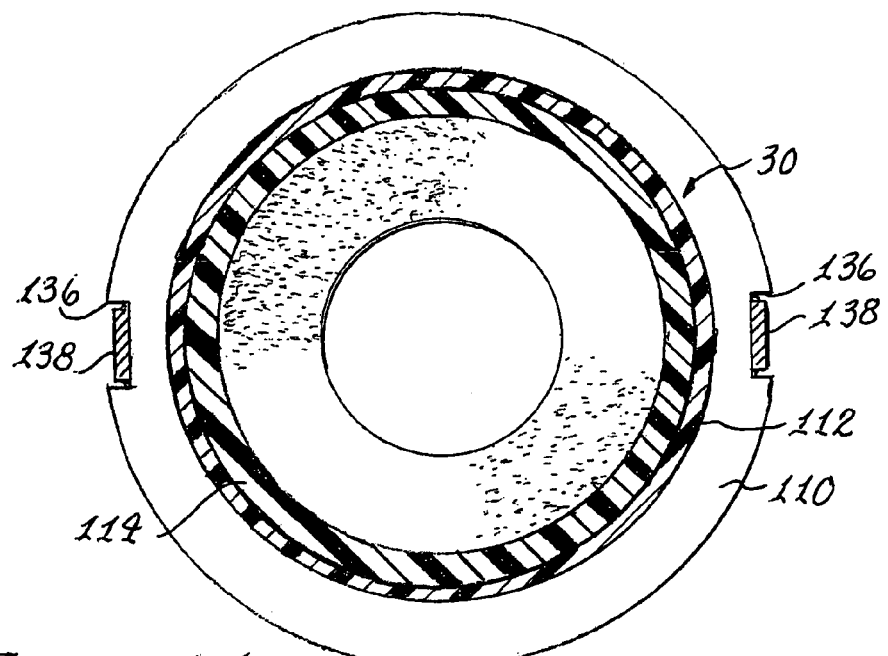
FIG. 11 is a sectional view taken along the line 11-11 of FIG. 9.
Figure 10:
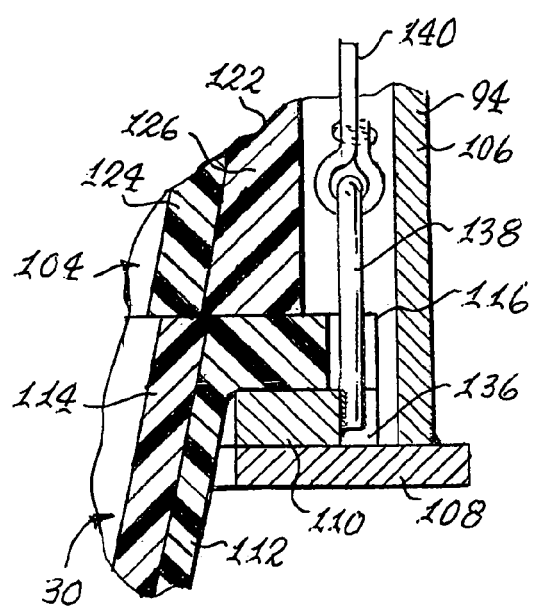
FIG. 10 is an enlarged fragmentary sectional view of the encircled portion 10 of FIG. 9.

As seen best in FIG. 11, the lifting ring 110 has a pair of notches 136 formed at diametrically opposed sides thereof with a pair of upstanding tabs 138 each located in a different one of the notches and attached to the lifting ring 110 such as by welding. The tabs 138 extend upwardly from the ring 110 and the lower ends of a pair of hoisting straps or cables 140 are each attached to a different one of the tabs. The hoisting straps 140 extend upwardly between the inner walls of the conical housing 22 and the periphery of the cone liners 96, 98 and 104. The upper ends of the hoisting straps 140 enter the lower end of the cylindrical head 17 of the inlet housing 15 and pass through slots 142 in the housing to the exterior of the cyclone 14. The hoisting straps 140, which have suitable connecting hardware such as D-rings 144 on their upper ends, are stored on the outside of the cyclone housing and are used in liner replacement operations as will be described below.

Figure 12:
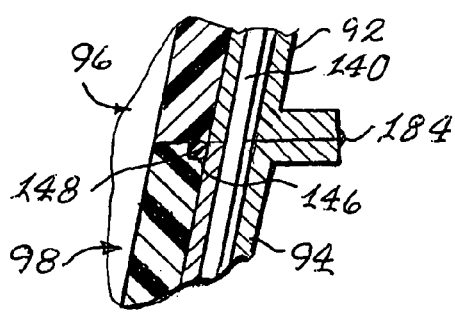
FIG. 12 is an enlarged fragmentary sectional view of the encircled portion 12 of FIG. 9.

As previously mentioned, mounting of the cover plate 18 on the inlet housing 15 exerts a downward force which seals the joint between the depending lip 91 of the cover plate liner and the upper edges of the liners 38, 40 and 42. That same force is transmitted downwardly to seal the joints between the cone liners 96, 98 and 104. As seen in FIG. 12, wherein the joint between the upper and middle cone liners 96 and 98 is best seen, the integrity of the seal formed at that joint can be assured by forming an annular groove 146 in the top edge of the lower cone liner 98 and installing an O-ring 148 in the groove. It will be understood that the groove 146 and the O-ring 148 shown in FIG. 12 are intended to be typical of a seal configuration that can be provided at the joint between each of the liners 38, 40, 42, 86, 96, 98 and 104.

The cyclone liner replacement method of the present invention includes the initial steps which are preformed when the cyclone 14 includes the above described first embodiment of the means for extracting and replacing worn cone liners. Also, these same initial steps will also be preformed when the second embodiment of the means for extracting and replacing worn cone liners is employed as will hereinafter be described. Both embodiments of the methods of the present invention for in-situ replacement of cyclone liners includes the initial step of disconnecting the cyclone 14 from the discharge duct 36, and if the transition duct 28 is to be inspected and possibly replaced, the slurry supply conduit 26 should be disconnected. The next step which can be best seen in FIG. 8, includes removing the cover plate 18 and the cover plate liner 86. Prior to removing the, cover plate and cover plate liner, the optional step of removing the overflow nozzle 19 and the vortex finder 20 may be accomplished or they can be left in place and removed along with the cover plate. Then the special fasteners 48 are removed and the feed duct liner 38 and the arcuate liner segments 40 and 42 are lifted out of the inlet housing 15. In that there are three separate liners used in the inlet housing 15 each is relatively light and can be removed by hand.

When the initial steps are completed, the following steps are preformed when the cyclone includes the first embodiment of the means for extracting and replacing the cone liners. Referring now to FIGS. 13a through 13c, these next steps include fishing the hoisting straps 140 through the slots 142 into the interior of the inlet housing 15 followed by the step of connecting the D-rings 144 of the straps to the opposite ends of a bail 150. A suitable lifting mechanism, such as a crane (not shown), is then operated to move the bail 150 and axially pull the stacked array of liners 96, 98, 104, the apex cone 30 and the anti-splash skirt 32 to a first position wherein the upper cone liner 96 is clear of the open top of the inlet housing 15 as seen in FIG. 13b. Upon reaching this first position, operation of the lifting mechanism is interrupted and the upper cone liner 96 is manually removed from the stacked array. Operation of the lifting mechanism is then sequentially resumed and interrupted to move the stacked array into second and third positions (not shown) wherein the cone liners 98 and 104 are in turn removed manually from the stacked array. Final operation of the lifting mechanism raises the apex cone 30 and the anti-splash skirt 32 clear of the housing 22. The liner replacement portion of the operation is completed by a reversed sequence of the above described steps of the method of the present invention.

In view of the above, it will be seen that removal of the cover plate 18 and the cover plate liner 86 from the cyclone 14 is the only disassembly of the cyclone housing now required to accomplish liner inspection and replacement operations. This disassembly can be simplified by replacing the nuts and bolts heretofore used to attach the modified cover plate 18a with clamping means 152 and hinges 154 as shown in FIGS. 14, 15 and 16. FIG. 14 shows a plurality of the clamping means 152 as being used to secure the cover plate 18a. The clamping means 152 can be over-center latches, however, the swing bolts 152 as seen in FIG. 15 are preferred. The swing bolts 152 are mounted to the side of the inlet housing 15 by a clevis 156 which supports an axle 158. A sleeve 162 is provided on the lower end of the bolt 160 and the sleeve is mounted on the axle 158 so that the bolt 160 is pivotable between the solid and dashed line positions. In the solid line position, the bolt 160 extends upwardly through outwardly opening slots 164 formed in the flange 166 of the inlet housing 15 and in the cover 18a. A nut 168 is threadingly mounted on the bolt 160 to hold the cover in the mounted position, and loosening of the nut allows the bolt to be swung into the dashed line position. The cover 18a can be attached to the inlet housing 15 by using only the swing bolts 152, however it is preferred that the hinges 154 be used for reasons which will be described. The hinges 154 may be mounted in the position shown or any other suitable position with the structural details being shown in FIG. 16. A gusset 170 is mounted on the side of the inlet housing 15 and a hinge pin 172 extends oppositely from the gusset. A hinge plate 174 is mounted fast on the upper surface of the cover plate 18a and a spaced apart pair of L-shaped arms 176 are carried on the hinge plate. A sleeve 178 is mounted between the depending ends of the L-shaped arms 176 with the hinge pin 172 positioned in the bore 180 of the sleeve to allow the cover plate 18a to be moved from the closed position to an opened position as indicated by dashed lines.

Figure 17:
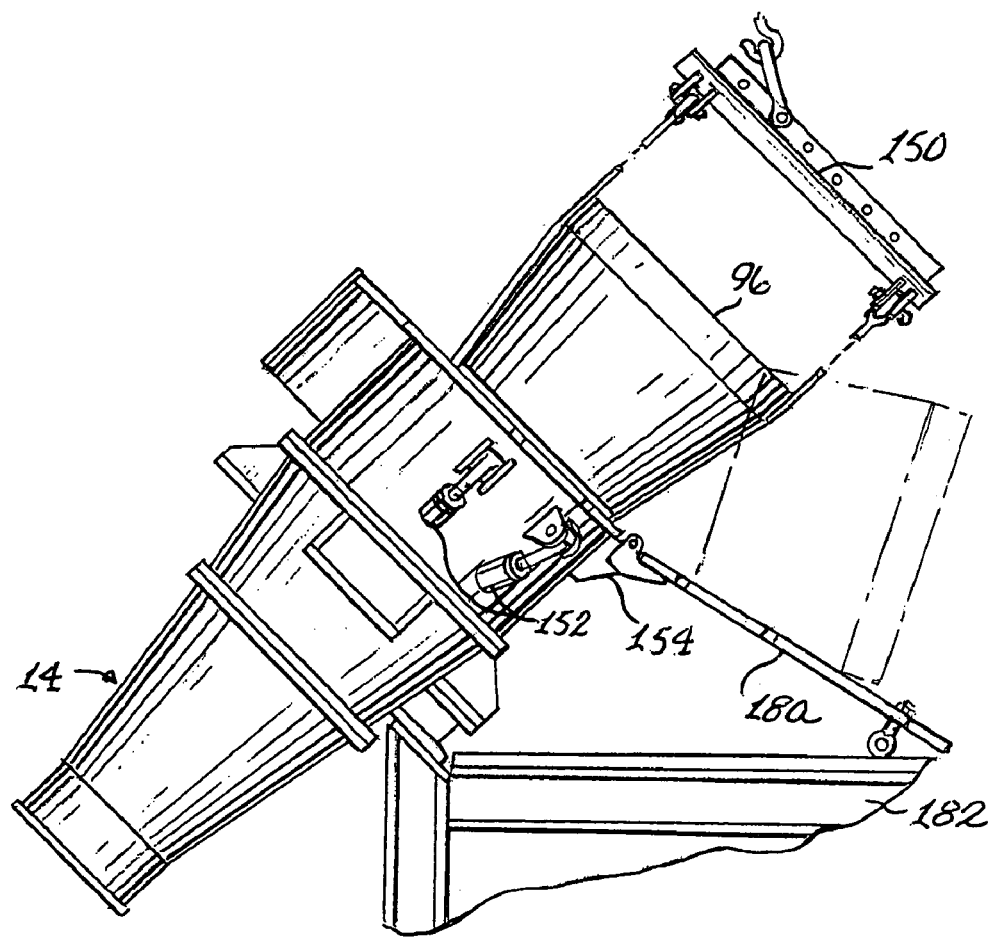
FIG. 17 is an elevational view of the cyclone of FIG. 1 showing it mounted in an angular disposition with the second embodiment of the cover plate shown in FIG. 14 being open to serve as a ramp in aiding the handling of the cone liners during a liner replacement operation.

In some installations cyclones are mounted in an inclined position as shown in FIG. 17. In such positions, the cover plate 18a can be swung into the open position so that it rests on the cyclone supporting structure 182. When in this position, the cover plate 18a acts as a ramp to aid in the handling of the cone liner 96 and the other cone liners handled during replacement operations. In some installations opening the cover plate 18a in this manner may not be possible and complete removal of the cover can be accomplished by removing the hinge pin 172.

When retrofitting existing cyclones to include the in-situ liner replacement system of the present invention, no changes need to be made in assembling a cyclone housing by bolting the plurality of housing components to each other. However, as a direct result of the liner replacement system of the present invention, new and improved cyclone housing assembly techniques and design will now be disclosed.

Figure 9:
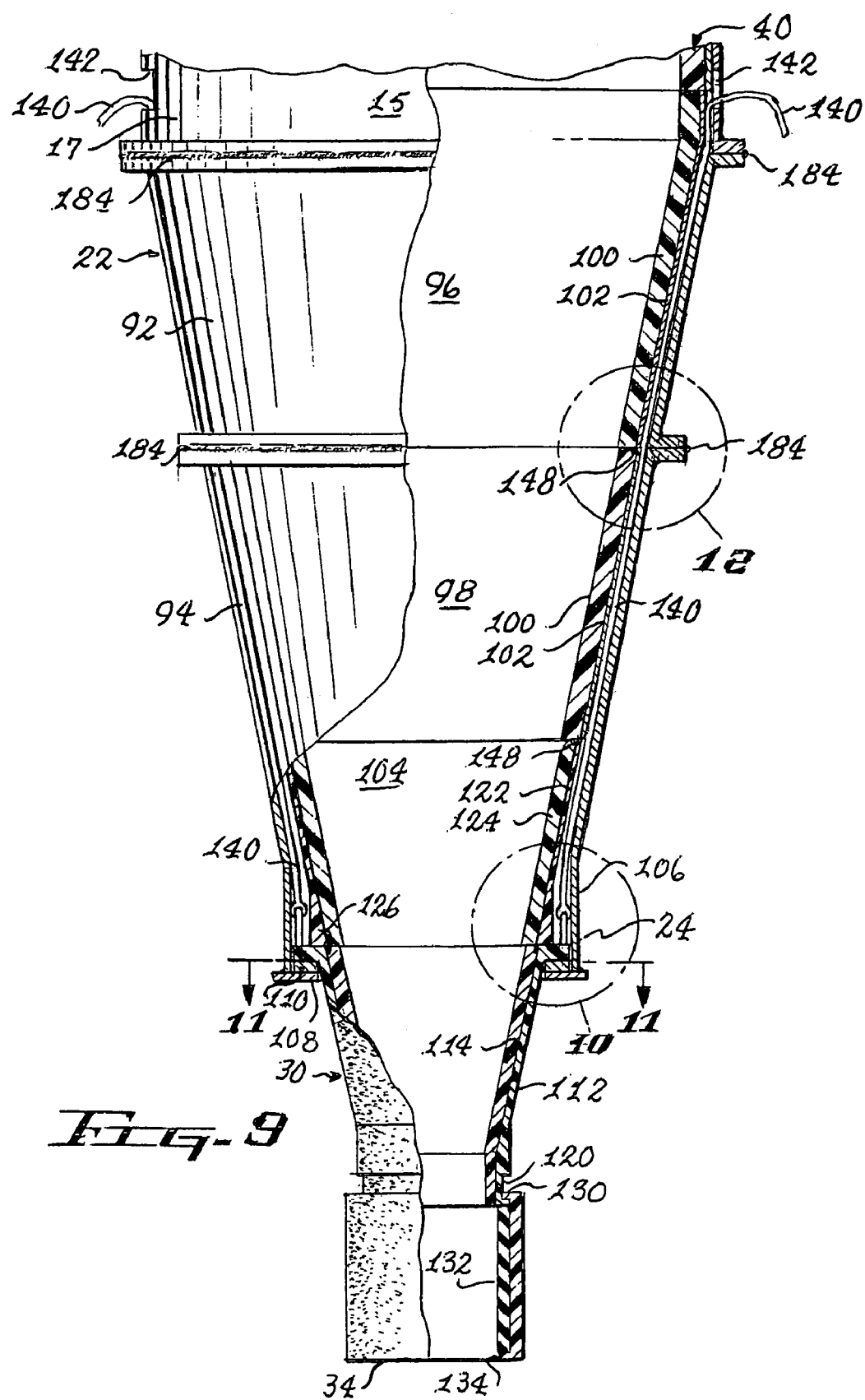
FIG. 9 is a fragmentary elevational view of the cyclone shown in FIG. 1 which is partially broken away to show the various features of the conical housing, with the cone liners and the splash skirt therein and showing the first embodiment of a means for extracting and replacing the cone liners.

In a first modified technique for assembling a cyclone housing the separate components of the housing are welded to each other as shown best at 184 in FIG. 9. In addition to eliminating the use of bolts, washers and nuts, using gaskets between the mating flanges will also be eliminated and the chances for developing leaks at the joints will be substantially reduced if not eliminated.

Figure 18:
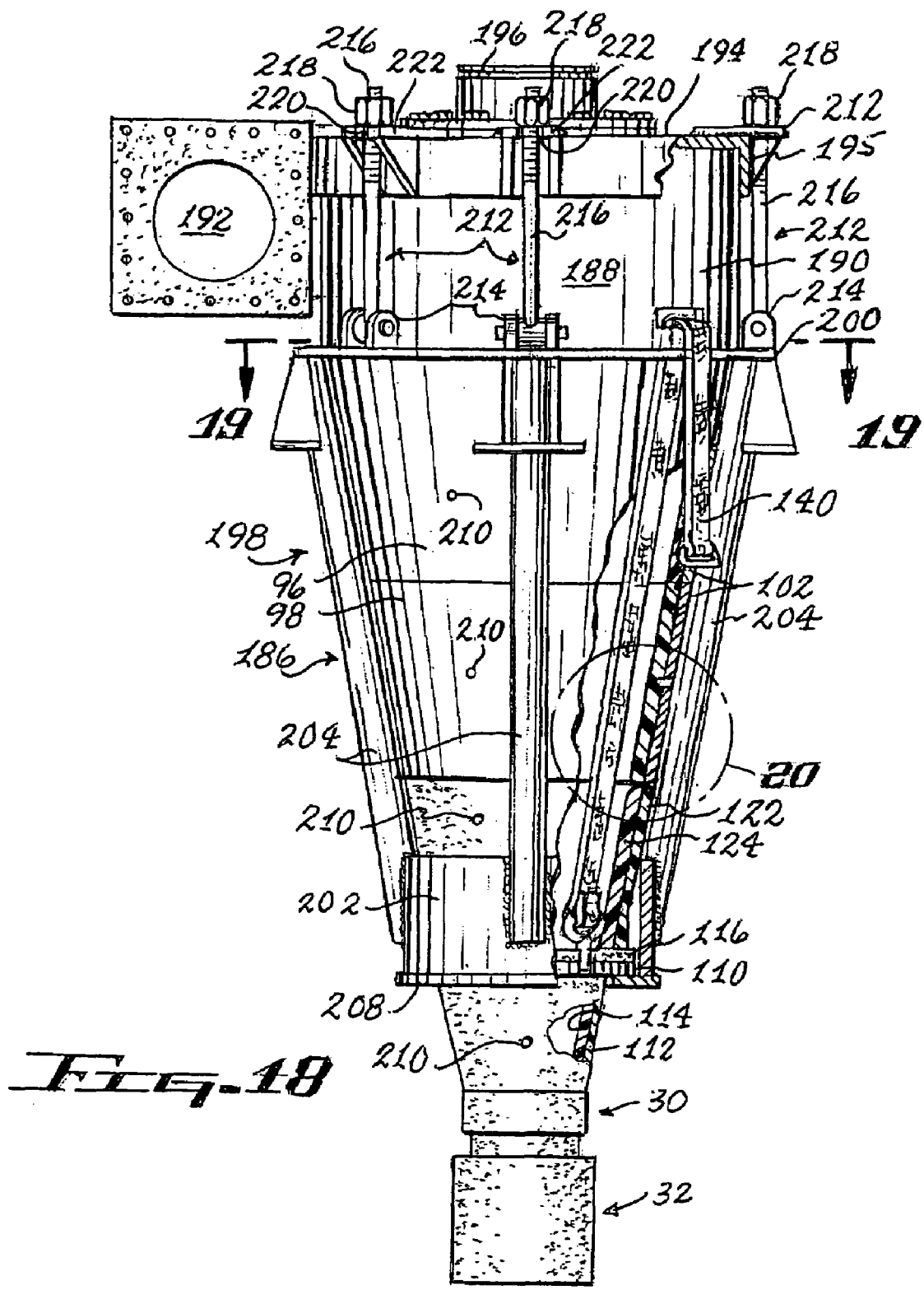
FIG. 18 is an elevational view similar to FIG. 1 showing a modification of the cyclone housing of the present invention which is partially broken away to show the various features thereof.
Figure 19:
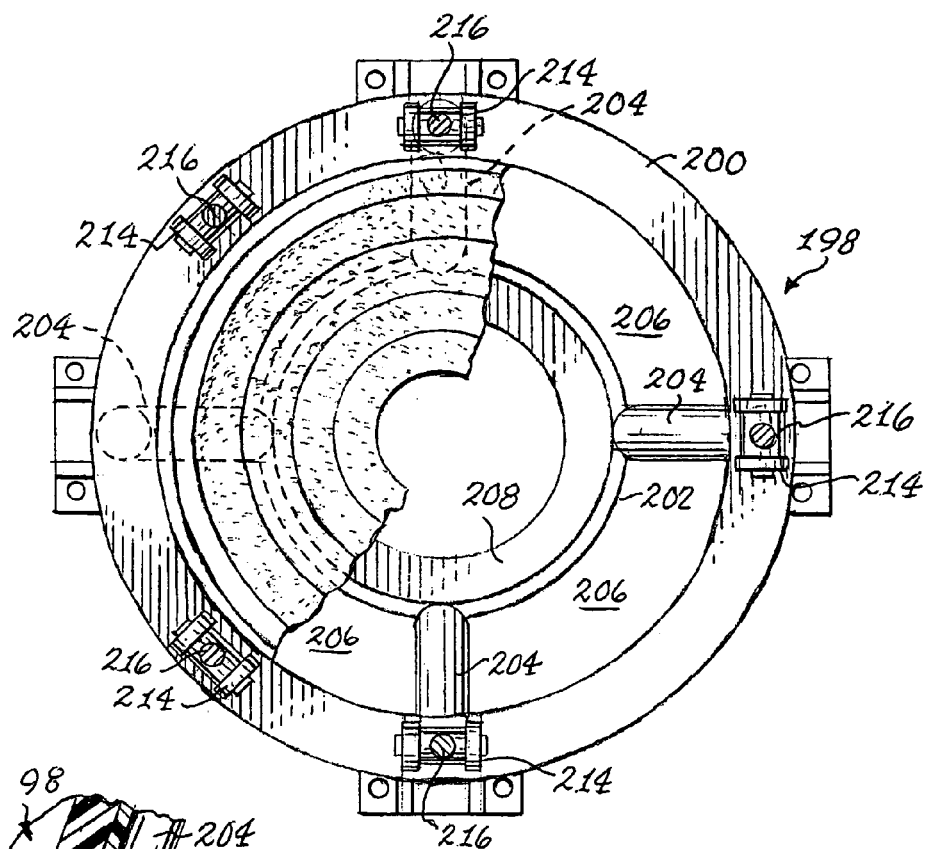
FIG. 19 is an enlarged sectional view taken along the line 19-19 of FIG. 18 with portions of the view being broken away to show the various features thereof.

A second modified assembly technique is shown in FIGS. 18 and 19, to include a modified cyclone housing 186. The cyclone housing 186 includes the major components of an inlet housing 188 having a head section 190 and a feed duct 192. The open upper end of the inlet housing 188 is closed by a cover plate 194 having an apron 195 with an overflow nozzle 196 mounted on the cover plate, and a conical housing 198 depends axially from the open lower end of the head section 190 of the inlet housing 188. In addition to a modified assembly technique, which will hereinafter be described in detail, the major differences between the cyclone 186 and those hereinbefore disclosed are in the conical housing 198. The conical housing is provided with a flange 200 which circumscribes its open upper end and a sleeve 202 is provided at its lower apex end. The flange 200 and the sleeve 202 are interconnected by a plurality of struts 204 which may vary in number with it being preferred that at least four of the struts be provided. In addition, the struts 204 may be tubular as shown or they may be beams of any suitable shape such as I-beams. The struts 204 are disposed to taper downwardly from the flange to the sleeve and are radially spaced relative to each other to form the housing 198 into a cage-like structure having openings 206 about the periphery of the housing. A ring-shaped shelf 208 is provided at the open lower end of the sleeve 202 and the lifting ring 110 with its upwardly extending hoisting straps 140 (one shown in FIG. 18) is restingly supported on the shelf. The annular flange 116 of the apex cone 30 is in turn supported on the lifting ring 110 so that the apex cone 30 and the anti-splash skirt 32 depend axially from the conical housing 198. The cone liners 96, 98 and 104 are supported on the annular flange 116 of the apex cone 30 in a stacked array which is removable as set forth in the previously described liner replacement method of the present invention.

The open-sided conical housing 198 provides a clear view of the cone liners 96, 98, and 104 so that weep holes 210 formed at various locations in the cone liners are in plain view. It will be understood that the following description of the weep hole 210 shown in FIG. 19 will apply to all of the weep holes. The weep hole 210 is formed in the rigid substrate 102 of the cone liner 98 and extends into the abrasive resistant liner 100 a predetermined distance so that the inner end of the weep hole is buried below the inner surface of the liner 100. The abrasive nature of the slurry being processed in the cyclone will wear down the liner material 100 to a point where the inner end of the weep hole 210 becomes open to the inside of the cyclone. When this occurs a small amount of the slurry liquid will seep out through the weep hole 210 and provide a visual indication that a liner replacement operation should be scheduled.

The cyclone housing 186 has a plurality of swing bolt assemblies 212 each including a clevis 214 that is mounted on the flange 200 of the conical housing 198. An elongated bolt 216 having a nut 218 threadingly carried on its upper end is pivotably mounted in each clevis 214. Each of the bolts 216 extends upwardly from its clevis 214 through an outwardly opening slot 220 formed in a load-bearing plate 222 mounted on top of the cover plate 194. When in the position shown, the swing bolt assemblies 212 clamp the cover plate 194 on the inlet housing 188 and clamp the conical housing 198 to the bottom of the head section 190 of the inlet housing 188.

Figure 20:
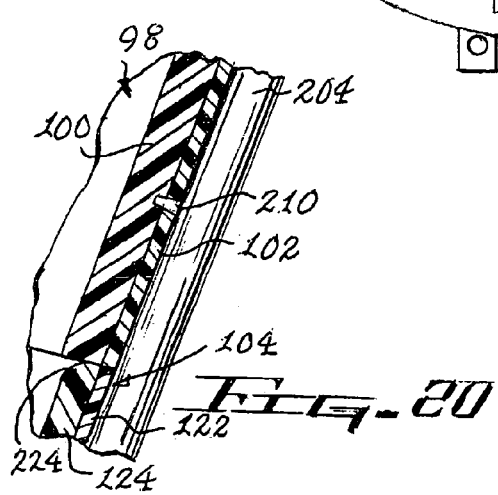
FIG. 20 is an enlarged view of the encircled portion 20 of FIG. 18.
Figure 21:
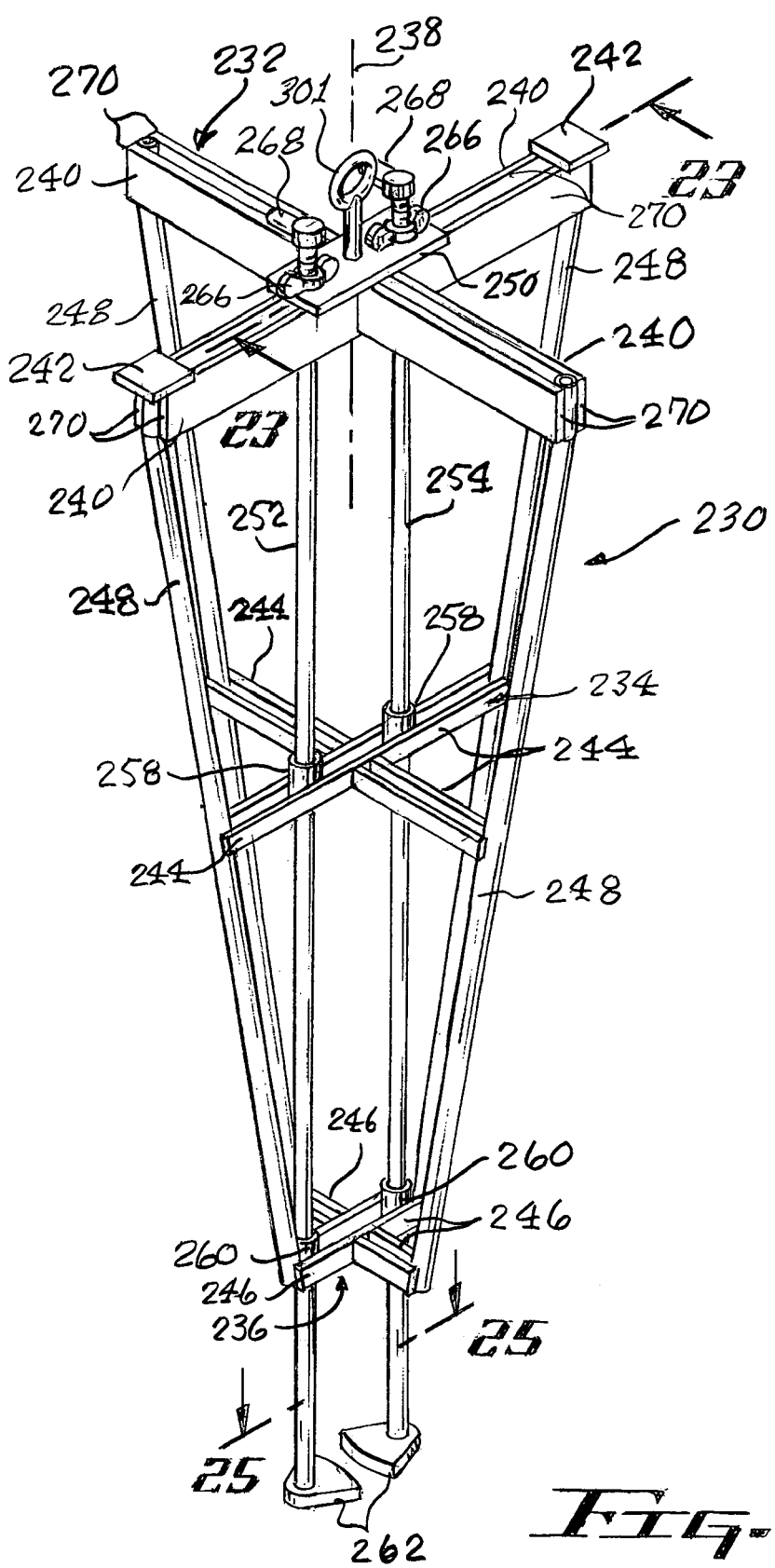
FIG. 21 is a perspective view of a hoist assembly which is the second embodiment of the means for extracting and replacing the cone liners of the cyclone.

As previously mentioned, the upper and middle cones 96 and 98 have a soft abrasion resistant liner 100 such as rubber or high energy urethane bonded to their substrates 102 and the lower cone 104 has a ceramic liner 124 bonded to its substrate 122. Those liner materials are preferred due to their different characteristics which enable them to best withstand the different percussion and abrasion forces that occur within their particular areas of the cyclone. The different wear characteristics of the two dissimilar materials can cause a turbulence problem in the cyclone. The liner of soft material wears faster than the ceramic liner and when the soft material liner 100 reaches a thickness that is less than the thickness of the ceramic liner 124, the top edge of the ceramic liner will protrude into the cyclone further than the soft material liner. This is referred to in the industry as a "reverse step" and it produces turbulence by deflecting the downwardly moving slurry into the center of the cyclone which disrupts the flow of slurry and classified materials being carried upwardly by the vortex. This problem is eliminated, or at least substantially reduced, by forming a curved surface 224 on the inner edge of the top surface of the ceramic liner 124 as seen best in FIG. 20. The curved surface 224 is intended to anticipate the wearing down of the soft material liner 100 and may be a segment of a circle or an irregular curve as determined by the wear characteristics of the cyclone and the materials being classified therein. It will be understood that a curved surface similar to the surface 224 can be formed at any junction between dissimilar cyclone liner materials where turbulence resulting from a reverse step could occur.

Reference is now made to FIGS. 21 through 25 which shows a second embodiment of the means for extracting and replacing worn out cone liners. This second embodiment is in the form of a hoist assembly which is indicated in its entirety by the reference numeral 230 in FIG. 21. The hoist assembly 230 includes an upper cruciform frame 232, a middle cruciform frame 234 and a lower cruciform frame 236 which are disposed in spaced apart alignment with respect to each other along a central axis 238. The upper frame 232 has four arms 240 that extend from the center at right angles with respect to each other and a diametrically opposed pair of the arms 240 each has a bearing plate 242 mounted so as to protrude beyond the distal end thereof for purposes which will hereinafter be described in detail. The middle frame 234 has four arms 244 that extend from the center at right angles with respect to each other, and the lower frame 236 similarly has four arms 246 which extend from the center at right angles with respect to each other. The arms 240, 244 and 246 of the frames 232, 234, and 236 are in alignment with each other and are interconnected at their distal ends by four beams 248 each of which extends between a different set of the aligned arms.

Figure 23:
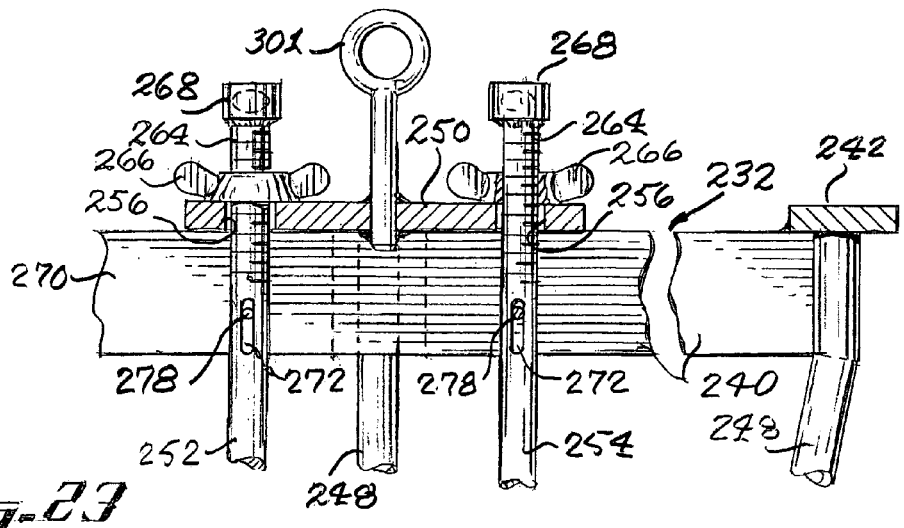
FIG. 23 is an enlarged fragmentary sectional view taken along the line 23-23 of FIG. 21.
Figure 24:
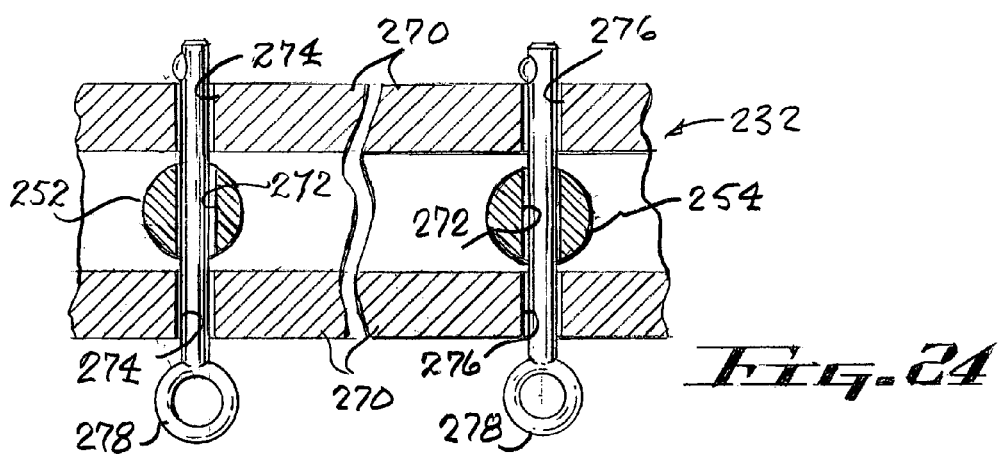
FIG. 24 is an enlarged fragmentary sectional view taken along the line 24-24 of FIG. 22.
Figure 25:
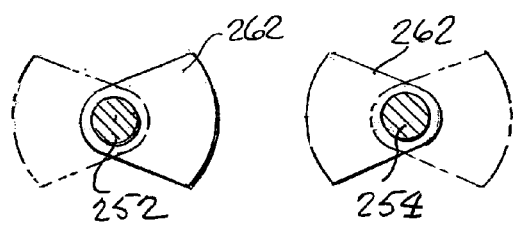
FIG. 25 is an enlarged sectional view taken along the line 25-25 of FIG. 21

As seen best in FIG. 23, a plate 250 is mounted atop the upper cruciform frame 232 at the center thereof, and a pair of elongated rods 252 and 254 have their upper ends passing through a spaced apart pair of openings 256 formed in the plate. The rods 252 and 254 extend longitudinally from the plate 250 through a spaced apart pair of sleeves 258 that are mounted in the middle cruciform frame 234 and through a spaced apart pair of sleeves 260 mounted in the lower cruciform frame 236. The lower ends of the rods 252 and 254 are disposed below the lower cruciform frame 236 and each has a dog 262 fixed on its lower end. The upper end of each of the rods 252 and 254 is threaded as at 264 and wing nuts 266 are mounted thereon. The wing nuts 266 are in bearing engagement with the top surface of the plate 250 and threaded movement of the wing nuts 266 will move the rods 252 and 254 axially in the openings 256 formed in the plate and in the sleeves 258 and 260 of the middle and lower cruciform frames 234 and 236 respectively. In this manner, the dogs 262 mounted on the lower ends of the rods 252 and 254 can be moved axially toward or away from the lower cruciform frame 236. Also, a handle 268 is fixedly mounted on the upper end of each of the rods 252 and 254 for manual rotation of the rods through 180 degrees. Such operation will move the dogs 262 between a retracted position of facing one another and an extended position of facing away from one another. The retracted position is shown in solid lines in FIG. 25 and the extended position is shown in dashed lines in the same figure.

The arms 240 of the upper cruciform frame 232 are formed of a spaced apart pair of plates 270 and the rods 252 and 254 extend between the plates. An elongated slot 272 is formed through each of the rods 252 and 254 in the areas thereof which are disposed between the plates 270. An aligned pair of holes 274 are formed through the plates 270 proximate the slot 272 in the rod 252 and a similar pair of holes 276 are formed through the plates proximate the slot 272 formed in the rod 254. A pair of pins 278 are provided with a first one of those pins being demountably positioned so as pass through the holes 274 formed in the plates 270 and through the slot 272 provided in the rod 252. A second one of the pins 278 similarly passes through the holes 276 formed in the plates and through the slot 272 formed in the rod 254. When the pins 278 are positioned as shown and described, the rods 252 and 254 will be locked against rotation by the pins. When the pins are pulled, the rods are free to be rotated through the 180 degrees needed to rotate the dogs 262 as mentioned above and after having been rotated, the pins 278 are reinserted to lock the rods 252 and 254 in the rotated positions.

Figure 22:
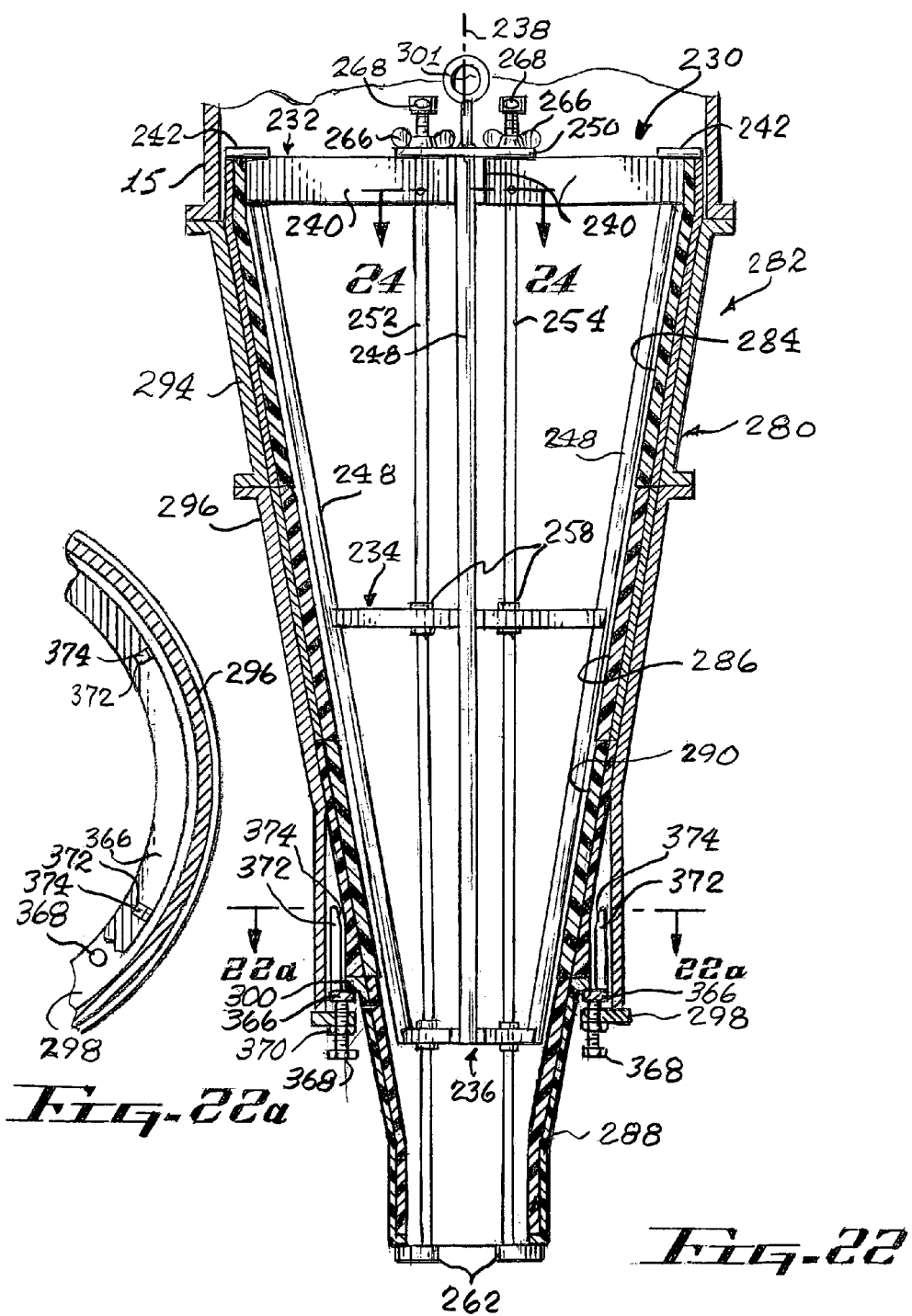
FIG. 22 is a fragmentary sectional view similar to FIG. 9 showing the second embodiment of the means for extracting and replacing the cone liners in position within the conical housing.

As seen in FIG. 22, the hoist assembly 230 is intended to be installed in the conical housing 280 of a cyclone 282. Therefore, the upper cruciform frame 232 is sized to fit in the top end of the upper cone liner 284, the middle cruciform frame 234 is sized to fit within the middle cone liner 286, and the lower cruciform frame 236 is sized to fit within the apex cone 288 that is located below the lower cone liner 290. The exact locations of the middle and lower cruciform frames 234 and 236 are not critical in that the middle frame 234 can be anywhere which is approximately half way along the length of the conical housing 280 and the lower frame 236 can be located anywhere that is proximate the open lower end 292 of the conical housing. The conical housing 280 is shown as having upper and lower truncated cone housings 294 and 296 respectively, which can be welded together as shown in FIG. 9, bolted together as shown in FIG. 1, or can be open sided as shown in FIG. 18. A ring-shaped shelf 298 is provided so as to circumscribe the open lower end 292 of the conical housing 280 and extend into the open lower end of the conical housing. The apex cone 288 is provided with an annular flange 300 that circumscribes the upper end thereof and that flange can rest on the ring-shaped shelf 298 in the manner previously described with reference to FIG. 9. Alternatively, a compression and array centering assembly 302 can be interposed between the shelf 298 and the flange 300 of the apex cone 288 as will hereinafter be described.

When the hoist assembly 230 is to be installed in the housing 280, the anti-splash skirt 32 need not be removed from the end of the apex cone 288 due to configuration and resilient nature. With the dogs 262 in the retracted position, the hoist assembly 230 is then lowered into the conical housing 280 so that the bearing plates 242 on the top of the upper cruciform frame 232 are in resting engagement on the top end of the upper cone liner 282 and the dogs 262 are disposed below the bottom end of the apex cone 288. The handles 268 are then used to rotate the dogs 262 into the extended position and the wing nuts 266 are then threadingly moved on their respective ones of the rods 252 and 254 to move them upwardly and thereby bring the dogs 262 into bearing engagement with the bottom end of the apex cone 288. Rotation of the dogs 262 and raising them into bearing engagement with the apex cone 288 are the operations of the hoist assembly 230 that exerts a clamping action on the stacked array of cone liners to hold them in position and attach the hoist assembly to the cone liners. It is to be understood that the phrase "cone liners" is used to collectively define the upper, middle and lower cone liners 284, 286 and 290 and the apex cone 288.

When the hoist assembly 230 is in place within the conical housing 280 and operated to exert a clamping action on the cone liners, the hoist assembly is them pulled from the conical housing. Extraction of the hoist assembly 230 will move the stacked array of cone liners as an entity out of the conical housing 280. The hoist assembly and attached cone liners can be pulled from the conical housing 280 such as by means of a suitable crane (not shown) attached to a lift eye 301 mounted on the plate 250 provided on top of the upper cruciform frame 232. The hoist assembly 230 can be fabricated of light weight materials such as aluminum and its weight along with the cone liners is not excessive. Thus, the hoist assembly 230 carrying the cone liners can be manually extracted from the conical housing 280.

A second embodiment of the method of the present invention will now be described wherein the hoist assembly 230 is the means for extracting worn cone liners. The initial steps of this second embodiment are the same as those which were previously described with reference to the cyclone 14 shown in FIG. 1 and include the first step of disconnecting the cyclone 14 from the discharge duct 36 and, if the transition duct 28 is to be inspected and possibly replaced, the slurry supply conduit 26 should be disconnected. The next step, which can be seen best in FIG. 8, includes removing the cover plate 18 and the cover plate liner 86. Prior to removing the cover plate 18 and the cover plate liner 86, the optional step of removing the overflow nozzle 19 and the vortex finder 20 may be accomplished or they can be left in place and removed along with the cover plate. Then the special fasteners 48 are removed and the feed duct liner 38 and the arcuate liner segments 40 an 42 are lifted out of the inlet housing 15. When the above describe initial steps are completed, this second embodiment of the method of the present invention includes the next step of inserting the hoist assembly 230 axially into the cone liners housed within the conical housing 280 of the cyclone 282, followed by operating the hoist assembly to exert a clamping action on cone liners to attach itself to them and hold them in the axially stacked array. Then, the next step includes pulling the hoist assembly 230 out of the conical housing 280 through the opened inlet housing 15 to extract the cone liners from the cyclone 282.

Once the cone liners have been extracted in the manner described above, the hoist assembly 230 upon which the liners are carried can be moved to a convenient work station for liner inspection and replacement as needed. The preferred method for accomplishing the inspection and replacement operations will now be described with reference being made to FIG. 26. These further steps include laying the hoist assembly 230 and the attached cone liners in the prone position on an especially constructed staging device 304 which will hereinafter be described in detail, followed by the step of removing the hoist assembly from the cone liners. The next step is inspecting the cone liners for wear and replacing those that are worn out to provide a refurbished liner array. When the liner inspecting and replacing steps are completed, the next step is inserting the hoist assembly 230 axially into the refurbished liner array and operating it to exert a clamping action thereon to attach the hoist assembly to the liner array and hold it in the axially stacked position. Then inserting the hoist assembly and the attached liners into the conical housing 280 of the cyclone 282 is the next step followed by removing the hoist assembly from the inserted liner array. The final steps include installing the segmented inlet liners 40 and 42 and the feed duct liner 38 in the inlet housing 15, reinstalling the overflow nozzle 19 and vortex finder 20, the cover plate 18 and cover plate liner 86. Reconnecting the slurry supply conduit 26 and overflow duct 36 completes the steps of the second embodiment of the method of the present invention.

The previously mentioned staging device or fixture 304 is seen to include a frame 306 which is configured to substantially match the shape of the stacked array of cone liners which are shown in dashed lines at 308 in FIG. 26. The lower end of the apex cone 288 rests in a first saddle 310 provided in the frame 306 and a second saddle 312 is spaced from the first saddle for supporting upper end of the apex cone 288. The lower, the middle and the upper cone liners 290, 286 and 284 respectively, rest on the side rails 314 and 316 of the frame 306.

FIG. 27 shows preferred configurations of a truncated upper cone liner 320, a truncated middle cone liner 322, and a truncated lower cone liner 324 as having longitudinally extending ribs 336 formed in radially spaced increment on the peripheral surfaces of their substrates. The ribs 336 allow liners which do not seat properly within the conical housings of cyclones to be rotated to clear dents, out of round conditions, and other irregularities resulting from used and/or repaired housings. If interference persists after rotation of the liners 320, 322 and/or 324, one or more ribs can be ground down rather than having to grind down relatively large portions of a conventional liner.

FIGS. 28a thru 28d show various joints that can be used at the mating surfaces of all the liners and especially so that the cone liners will be automatically aligned in the desired array and form seals at the mating edge surfaces of the liners. The joint shown in FIG. 28a is a form of rabbet joint 328 having a portion of its mating surfaces in the form of inclined planes as seen at 330. The lower edge of the protrusion on the upper surface 332 of the joint is sized so as to provide a space 334 between it and the recessed surface of the lower surface portion 336 of the joint. In addition to aligning the liners, the inclined surfaces 330 of the joint 328 interacts with the spaced fitting of the protruding upper surface portion 332 in the recessed lower surface portion 336 so that the weight of the upper cone liner will bear down on the lower cone liner to form the desired seal.

The joint shown in FIG. 28b is a modified form of a tongue and groove joint 338 wherein the tongue 340 and the groove 342 are both in the form of truncated wedges have inclined side edges 344, and the tongue 340 is sized to provide a space 346 between its bottom surface and the bottom surface of the groove 342. The joint 338 is provided with inclined surfaces and a space between the tongue and groove and will therefore be self-aligning and self-sealing in the manner describe above describe with reference to the joint 328.

The joint shown in FIG. 28c is another modified form of a tongue and groove joint 348 wherein both the tongue 350 and the groove 352 are of semi-circular configuration with the tongue being nested within the groove to align the cones. The tongue 350 is located between a pair of side surfaces and the groove 348 is similarly located between a pair of side surfaces. The tongue 350 is sized to provide a space 354 between its lower end and the bottom of the groove 352 so that the weight of the upper cone will load the side surfaces on the bottom edge of the upper cone into sealed bearing engagement with the side surfaces of the top edge of the lower cone.

FIG. 28d is another modified form of a rabbet joint 356 having a portion of the mating surfaces thereof in the form of inclined planes as seen at 358. The substrate 360 of the lower cone liner is recessed below the upper edge thereof to provide a space 362 between the substrate 360 of the lower cone liner and the substrate 364 of the upper cone liner. This joint 356 is self-aligning and self-sealing as described above due to the inclined surfaces of the mating edges and the space provided between the substrates of the upper and lower cone liners.

The joints 328, 338, 348 described above are intended to be used at the junctions between the various inlet housing liners and the cone liners of the type having resilient liner material. The load applied at the joints by the weight of the upper liners will deform the mating surfaces to bring them into sealing contiguous engagement with each other. The joints used between liners formed of ceramic material preferably use the joint 356 or the O-ring seals 148 as shown and described with reference to FIG. 12.

When the joints 328, 338, 348 or 356 are used to align the plural liners of the stacked array and seal the junctions there between, it is important the mating surfaces of the liners be in contiguous bearing engagement with each other, and this is not always possible due to manufacturing tolerances. Further, in installations where the cyclones are mounted in an inclined position as shown in FIG. 17, gravity will cause a liner array that is being installed to move off-center and catch on the ring-shaped shelf 298 as the array is moved downwardly into the conical housing. The hereinbefore mentioned compression and array centering assembly 302 is used to overcome both of these problems.

As shown in FIGS. 22 and 22a, the compression and array centering assembly 302 includes aa compression ring 366 which is provided in the lower end of the conical housing 280 of the cyclone 282 and is restingly supported in a position above the ring-shaped shelf 298 on a plurality of adjustment bolts 368. The bolts are mounted in threaded bores provided in the ring-shaped shelf 298 so as to extend axially upwardly into the conical housing 280 and a jamb nut 370 is provided on each of the bolts to fix them in their adjusted positions. The annular flange 300 of the apex cone 288 is supported on the compression ring 366 and the liners 284, 286 and 290 are stacked on the flange 300 of the apex cone as hereinbefore described. Threaded movement of the adjustment bolts 368 will move the compression ring 366 and the stacked array of liners axially in the conical housing to bring the mating surfaces of the liners into contiguous bearing engagement with each other. The compression ring 366 is provided with a plurality of deflection rails 372 that extend upwardly from the top surface of the compression ring and each of the rails 372 are formed with an inwardly facing angular surface 374 at its upper end. When the stacked array of liners are moved downwardly into the conical housing 280 of a cyclone 282 that is mounted in an inclined position, the angular surfaces 374 of one or more of the deflection rails 372 will engage the periphery of the conical portion of apex cone 288 and deflect the stacked array of liners toward the center of the conical housing. In this manner, the stacked array of liners will clear the ring-shaped shelf 298 provided at the open lower end 292 of the conical housing.

Although only two of the adjustment bolts 368 and two of the deflection rails 372 are shown in FIG. 22, it will be understood that there are at least three of the adjustment bolts 368 and preferably six of the deflection rails 372 with the bolts and rails being arranged in radially spaced increments on the compression ring 366.

While the principles of the invention have now been made clear in illustrated embodiments, many modifications will be obvious to those skilled in the art which do not depart from those principles. The appended claims are therefore intended to cover such modifications within the limits only of the true spirit and scope of the invention.

What I claim is:

1. A hoist assembly for in-situ extraction of a stacked of array abrasion resistant liners from the conical housing of a cyclone, said hoist assembly comprising:
    a) a frame means for insertion into the stacked array of liners and the apex cone in the conical housing of the cyclone;
    b) a clamping means carried in said frame means and operable to exert a clamping force on the stacked array of liners and the apex cone to hold them in alignment and attach them to said frame means; and
    c) said frame means being movable to extract the stacked array of liners and the apex cone from the conical housing of the cyclone when said frame means has been inserted into the stacked array of liners and the apex cone and operated to exert a clamping force thereon.

2. A hoist assembly as claimed in claim 1 wherein said frame means comprises:
    a) an upper frame member sized to fit within the upper end of the stacked array of liners;
    b) a middle frame member sized to fit within the stacked array of liners at a location approximately intermediate the opposite ends thereof;
    c) a lower frame member sized to fit within the stacked array of liners and the apex cone at a location proximate the lower end thereof; and
    d) means for connecting said upper, said middle and said lower frame members to each other.

3. A hoist assembly as claimed in claim 2 wherein said means for connecting said upper, said middle and said lower frame members comprises a plurality of beams each disposed to extend between different side edges of said upper, said middle and said lower frame members.

4. A hoist assembly as claimed in claim 2 wherein each of said upper, said middle and said lower frame members is of cruciform configuration.

5. A hoist assembly as claimed in claim 2 wherein said clamping means comprises:
    a) a pair of bearing plates on said upper frame member and disposed to bear down on diametrically opposed sides of the upper end of the stacked array of liners when said frame means is inserted therein;

b) a spaced apart pair of elongated rods mounted for rotation and axial movement in said upper, said middle and said lower frame members, each of said pair of rods having a top end positioned above said upper frame member and a bottom end disposed below said lower frame member;

c) a pair of dogs each mounted on the bottom end of a different one of said pair of elongated rods; and d) means on the top end of said pair of rods for rotating them to move said pair of dogs between a retracted position of facing one another and an extended position of facing away from each other; and e) means on the top end of each of said pair of rods for moving them axially to raise said pair of dogs from a lowered position below the lower end of the apex cone into clamping engagement therewith when said frame means has been inserted in the stacked array of liners and the apex cone and said pair of rods have been rotated to move said pair of dogs to the extended position.

6. A hoist assembly as claimed in claim 5 wherein said means mounted on the top end of each of said pair of rods for rotating them is a handle.

7. A hoist assembly as claimed in claim 5 wherein said means on the top end of each of said pair of rods for moving them axially comprises;

a) threads formed on the top end of each of said pair of rods; and b) a nut mounted on the threaded top end of each of said pair of rods and in bearing engagement with the top surface of said upper frame member so that threaded movement of said nuts will move said pair of rods axially in said frame means.

8. A hoist assembly as claimed in claim 5 and further comprising cooperating elements of a locking means for releasably holding said pair of rods in first rotated positions wherein said pair of dogs are in the retracted position and second positions wherein said pair of dogs are in the extended position.

9. A method for in-situ replacement of worn abrasion resistant liners and an apex cone arranged in a stacked array in the conical housing of a cyclone comprising the steps of:

a) inserting a hoist assembly axially into the array of liners and the apex cone housed within the conical housing of the cyclone;

b) operating the hoist assembly to exert a clamping action on the array of liners and the apex cone to attach itself to them and hold them in the axially stacked array; and c) pulling the hoist assembly with the attached array of liners and the apex cone out of the conical housing of the cyclone.

10. The method of claim 9 wherein a series of initial steps are accomplished prior to said step of inserting the hoist assembly in the stacked array of liners, said series of initial steps comprising:

a) disconnecting at least a discharge duct from a nozzle of a vortex finder of the cyclone;

b) opening the top of an inlet housing of the cyclone by moving a cover plate and removing a cover plate liner; and c) removing at a feed duct liner and at least a pair of head section liners from the inlet housing.

11. The method of claim 10 including the optional step of removing the overflow nozzle and the vortex finder prior to opening the top of the inlet housing of the cyclone.

12. The method of claim 9 including the further step of moving said hoist assembly and the attached liners and the apex cone to a work station for inspection and replacement as needed.

13. The method of claim 9 including the further steps of:

a) moving said hoist assembly and the attached array of liners and the apex cone to a work station;

b) removing the hoist assembly from the array of liners and the apex cone;

c) inspecting the array of liners and the apex cone for wear;

d) replacing the worn out liners and the apex cone as needed to form a refurbished array of liners and the apex cone;

e) inserting the hoist assembly into the refurbished array of liners and the apex cone;

f) operating the hoist assembly to exert a clamping force on the refurbished array of liners and the apex cone to hold them in alignment and attach them to the hoist assembly;

g) inserting the hoist assembly with the attached refurbished array of liners and the apex cone into the conical housing of the cyclone on top of an adjustable compression ring located at the lower end of the conical housing;

h) removing the hoist assembly from the inserted refurbished array of liners and the apex cone; and i) adjusting the compression ring axially in the conical housing of the cyclone to bring the mating surfaces of the stacked array of liners and the apex cone into contiguous bearing engagement with each other.

14. The method of claim 9 and including the further steps of:

a) moving said hoist assembly and the attached array of liners and the apex cone into a prone position on a staging fixture;

b) removing the hoist assembly from the array of liners and the apex cone;

c) inspecting the array of liners and the apex cone for wear;

d) replacing the worn out liners and the apex cone as needed to form a refurbished array of liners and the apex cone;

e) inserting the hoist assembly into the refurbished array of liners and the apex cone;

f) operating the hoist assembly to exert a clamping force on the refurbished array of liners and the apex cone to hold them in alignment and attach them to the hoist assembly;

g) inserting the hoist assembly with the attached refurbished array of liners and the apex cone in the conical housing of the cyclone; and h) removing the hoist assembly from the inserted refurbished array of liners and the apex cone.

15. The method of claim 14 including the further steps of:

a) providing an adjustable compression ring at the lower end of the conical housing of the cyclone upon which the inserted refurbished array of liners and the apex cone are supported; and b) adjusting the compression ring axially in the conical housing to bring the mating surfaces of the stacked array of liners and the apex cone into contiguous bearing engagement with each other.

16. The method of claim 14 including the further steps of:

a) installing a feed duct liner and at least a pair of head section liners in the inlet housing of the cyclone;

b) closing the top of the inlet housing of the cyclone by installing the cover plate and cover plate liner on the inlet housing; and c) reconnecting the discharge duct to the nozzle of the vortex finder of the cyclone.

* * * * *